United States Patent [19]

Harris

[11] Patent Number: 4,948,862
[45] Date of Patent: Aug. 14, 1990

[54] MODIFIED POLY(ALKYLENE CARBONATE) POLYAHLS

[75] Inventor: Robert F. Harris, Midland, Mich.
[73] Assignee: The Dow Chemical Company, Midland, Mich.
[21] Appl. No.: 240,027
[22] Filed: Sep. 2, 1988

Related U.S. Application Data

[60] Division of Ser. No. 931,597, Nov. 17, 1986, Pat. No. 4,795,810, which is a continuation-in-part of Ser. No. 799,211, Nov. 18, 1985, Pat. No. 4,686,273, which is a continuation-in-part of Ser. No. 809,675, Dec. 16, 1985, Pat. No. 4,686,274.

[51] Int. Cl.$^5$ .................... C08G 18/32; C08G 18/38
[52] U.S. Cl. .................................... 528/77; 528/76; 528/85; 525/452; 525/459; 525/467
[58] Field of Search .......................... 528/76, 77, 85; 525/452, 459, 467

[56] References Cited

U.S. PATENT DOCUMENTS

| | | | |
|---|---|---|---|
| 3,133,113 | 5/1964 | Malkemus | 558/266 |
| 3,248,414 | 4/1966 | Stevens | 558/266 |
| 3,324,070 | 6/1967 | Hostettler et al. | 524/208 |
| 3,379,693 | 4/1968 | Hostettler et al. | 525/418 |
| 3,567,763 | 3/1971 | Emmons | 560/129 |
| 4,105,641 | 8/1978 | Buysch et al. | 526/712 |
| 4,108,842 | 8/1978 | Konig et al. | 528/61 |
| 4,191,705 | 3/1980 | Lindner et al. | 558/267 |
| 4,267,120 | 5/1981 | Cuscurida et al. | 558/267 |
| 4,394,491 | 7/1983 | Hoffman | 525/452 |
| 4,435,527 | 3/1984 | Cuscurida | 521/173 |
| 4,476,293 | 10/1984 | Robinson | 528/76 |
| 4,795,810 | 1/1989 | Harris | 528/370 |

OTHER PUBLICATIONS

W. Siefken, *Justus Liebigs Annalen der Chemie*, 562, 75–136.

*Primary Examiner*—John Kight, III
*Assistant Examiner*—Anang Sridharan

[57] ABSTRACT

Modified poly(alkylene carbonate) polyahls comprising the residue of at least one polyahl, at least one modifier, poly(alkyleneoxy) units, poly(alkylene carbonate) units, and a plurality of active hydrogen end groups are disclosed. The modified polyahls have an average molecular weight higher than any known polyahls containing at least the same weight percent modifier and the same poly(alkyleneoxy) and poly(alkylene carbonate) residues. Also disclosed are isocyanate-functional prepolymer compositions of these modified poly(alkylene carbonate) polyahls, which contain the residue of at least one modified poly(alkylene carbonate) polyahl of this invention and excess organic polyisocyanate units. Urethane/urea polymers formed by the reactions of the isocyanate-functional prepolymers with polyahls are also disclosed. Also disclosed are urethane/urea polymers comprising the residue of at least one modified poly(alkylene carbonate) polyahl of this invention, the residue of a polyisocyanate and the residue of at least one other polyahl selected from the group consisting of polyamines and polyfunctional hydroxyl compounds. The novel compositions of this invention are useful in urethane/urea polymer applications such as foams, elastomers, plastics, adhesives, coatings and the like.

16 Claims, 1 Drawing Sheet

MODIFIED POLY(ALKYLENE CARBONATE) POLYAHLS

CROSS-REFERENCE TO RELATED APPLICATIONS

This is a divisional of application Ser. No. 931,597, filed Nov. 17, 1986, U.S. Pat. No. 4,795,810, which is a continuation-in-part of U.S. patent applications Ser. No. 799,211 filed Nov. 18, 1985, U.S. Pat. No. 4,686,273, and which is a continuation-in-part of Ser. No. 809,675 filed Dec. 16, 1985, U.S. Pat. No. 4,686,274 and is a related application to U.S. patent application Ser. No. 750,362 filed July 1, 1985, now abandoned and Ser. No. 850,788 filed on Apr. 11, 1986, now U.S. Pat. No. 4,709,069.

FIELD OF THE INVENTION

This invention relates to polymeric compositions containing a poly(alkylene carbonate) backbone.

BACKGROUND OF THE INVENTION

Polyether polyols and polyester polyols are well-known polymers which can be further polymerized with organic polyisocyanates to prepare polyurethanes. Polyether polyols are prepared by the reaction of hydroxy-containing hydrocarbons, such as an aromatic or aliphatic diol or triol, and epoxides, e.g., ethylene oxide and propylene oxide. Polyester polyols are prepared by the reaction of polyacids, such as adipic or terephthalic acid, or esters of polyacids, such as dimethyl adipate or dimethyl terephthalate with dihydroxy-containing hydrocarbons, such as aromatic and aliphatic diols and triols. Some poly(alkylene carbonate) polyol properties resemble polyester polyol properties while other properties resemble polyether polyols.

It is known to prepare polycarbonates from aliphatic dihydroxyl compounds either by a process of phosgenation in which hydrogen chloride is liberated or bound by bases, such as pyridine or quinoline, or by a process of transesterifiation with carbonic acid esters of alcohols or phenols, preferably diphenylcarbonate, optionally with the aid of transesterification catalysts. In either case, it is essential to use phosgene or a mixture of carbon monoxide and chlorine as the source of carbonic acid. Technical processes which involve the preparation and handling of phosgene are difficult and costly on account of considerable safety risks involved and the high cost of materials due to corrosion. To this are added ecological problems since either the spent air is contaminated with hydrogen chloride or the effluent water is contaminated with sodium chloride.

Polycarbonates produced by these methods, using dihydrocarbyl compounds, may have a functionality of less than two due to inadequate or incomplete esterification or transesterification which often prevents the products from forming high molecular weight polymers in subsequent reactions.

U.S. Pat. Nos. 3,248,414; 3,248,415 and 3,248,416 to Stevens disclosed the preparation of poly(alkylene carbonate) polyols from (1) carbon dioxide and 1,2-epoxides;
(2) cyclic carbonates such as ethylene carbonate; or
(3) cyclic carbonates and a 1,2-epoxide.

A minor amount of a polyol is employed therein as an initiator. The reaction is usually conducted in the presence of a metal carbonate, metal hydroxide, trisodium phosphate or tertiary amine.

Poly(alkylene carbonate) polyols have also been prepared by polymerization of ethylene carbonates under pressure using basic catalysts and a minor amount of glycol as initiator as disclosed in U.S. Pat. No. 4,105,641 to Buysch et al. These products are low in carbonate and high in ether group concentration due to decomposition of the ethylene carbonate. In the Stevens patents discussed hereinbefore, a poly(alkylene carbonate) polyol derived from ethylene carbonate and monoethylene glycol was exposed to temperatures of 160° C. at 2 mm Hg of pressure to remove unreacted ethylene carbonate. In U.S. Pat. No. 3,379,693, Hostetler removed unreacted ethylene carbonate from products similar to poly(alkylene carbonate) polyols by heating to about 130° C. under a pressure of 1–5 mm Hg. In U.S. Pat. No. 3,896,090 to Maximovich, ethylene carbonate was reacted with diethylene glycol and the reaction product treated under reduced pressure to remove the unreacted ethylene carbonate and diethylene glycol.

Several workers have prepared poly(alkylene carbonate) polyols and related materials by controlling the equilibrium between the reaction materials of a diol and alkylene carbonate and the products of a poly(alkylene carbonate) polyol and monoethylene glycol. The reaction is controlled by the removal of monoethylene glycol.

In U.S. Pat. No. 3,133,113 to Malkemus, ethylene carbonate and diethylene glycol were reacted at 125° C. to 130° C. under a reduced pressure of 100 mm Hg in the presence of certain catalysts with concurrent removal of monoethylene glycol as a distillate. The catalyst employed was a mixed zinc borate-alkaline earth metal oxide catalyst. This was followed by removal of starting material. The Malkemus procedure is plagued by the presence of volatile ethylene carbonate which condenses as a solid throughout the system causing severe plugging and reducing ethylene carbonate conversion while monoethylene glycol is being removed. This process requires large excesses of ethylene carbonate.

In U.S. Pat. No. 3,313,782 to Springmann et al., this process was further studied under reduced pressure in the presence of catalysts, and limits on the reaction conditions were set. The reaction temperatures must be lower in this process than the boiling point of the alkylene carbonate, but still high enough to distill off the monoethylene glycol formed.

U.S. Pat. No 4,131,731 to Lai et al. used stage reductions in pressure during the reaction of alkylene carbonate with a diol. The final stage of the Lai et al. process is intended to remove monoethylene glycol. The patentees characterized their reaction conditions by stating that the alkylene carbonate must have a boiling point 4.9° C. greater than monoethylene glycol. The chemistry based on the above equilibrium was improved upon by U.S. Pat. No. 4,105,641 to Buysch et al. where the reactions were carried out in a solvent (e.g., cumene) capable of removing monoethylene glycol as an azeotrope with the solvent.

Heretofore, the molecular weights of poly(alkylene carbonate) polyols from alkylene carbonates have been controlled by either the stoichiometry of the reactants, that is, higher alkylene carbonate to initiator ratios for higher molecular weights, or the removal of monoethylene glycol from the reaction mixture with an ethylene carbonate to initiator equivalent ratio of about 1. Catalysts are used in most cases since reaction rates are very slow in the absence of a catalyst. When high alkylene carbonate to initiator ratios are used to make higher molecular weight poly(alkylene carbonate) polyols, reaction rates drop severely as higher conversions are approached. In these cases, long reaction times are required and the products are contaminated by unreacted alkylene carbonate. If temperatures are increased to increase the rate, product decomposition occurs with $CO_2$ loss.

In view of the deficiencies of the conventional poly(alkylene carbonate) polyahls, it would be highly desirable to provide poly(alkylene carbonate) polyahls having improved physical and chemical properties.

SUMMARY OF THE INVENTION

In one aspect, this invention is a new, modified poly(alkylene carbonate) polyahl which is a polymer comprising (1) a backbone having (a) the residue of at least one polyahl initiator, (b) a plurality of poly(alkyleneoxy) moieties, and (c) a plurality of poly(alkylene carbonate) moieties: (2) a plurality of active hydrogen end groups: and (3) the residue of at least one modifier which resides in the polymer in the backbone and/or as an end group; wherein the modifier is selected from the group consisting of alkylene, aralkylene and cycloalkylene polyahls and alkylene, aralkylene and cycloalkylene polyahls containing one or more oxygen, sulfur or nitrogen atoms, said modified poly(alkylene carbonate) polyahls having a number average molecular weight higher than the number average molecular weight of any known poly(alkylene carbonate) polyahl comprising the same monomeric components in the same proportions. These modified poly(alkylene carbonate) polyahls contain at least about 5 weight percent carbon dioxide and at least about 5 weight percent modifier.

In a second aspect, this invention is an iso-cyanate-functional prepolymer composition of the modified poly(alkylene carbonate) polyahl formed by reaction of the modified poly(alkylene carbonate) polyahls with excess polyisocyanates.

In a third aspect, this invention is a novel urethane/urea polymer formed by the reactions of the novel isocyanate-functional prepolymer composition with any polyahl.

In a fourth aspect, this invention is a novel urethane/urea polymer formed by the reaction of the novel, modified poly(alkylene carbonate) polyahl of this invention with a polyisocyanate, optionally in the presence of other polyahls The introduction of a modifier into the backbone of the poly(alkylene carbonate) polyahl allows adjustment of the physical and chemical properties of the poly(alkylene carbonate) polyahl to maximize its effectiveness in specific applications. For example, the modified polyahls of this invention are useful for producing materials for applications in flexible urethane foams, urethane coatings, rigid urethane foams, urethane/urea elastomers and plastics, adhesives, functional fluids, polymeric coatings and surfactants among others. Moreover, many polymers made using the modified poly(alkylene carbonate) polyahls of this invention exhibit much improved hydrolytic stability over polymers made with the corresponding unmodified poly(alkylene carbonate) polyahls.

DETAILED DESCRIPTION OF THE INVENTION

The modified poly(alkylene carbonate) polyahl compositions of this invention can be prepared by the reactions of poly(alkylene carbonate) polyahls with one or more modifiers. During these reactions, the modifier is chemically combined with the poly(alkylene carbonate) polyahl.

Poly(alkylene carbonate) polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. An active hydrogen moiety is a moiety containing a hydrogen atom which because of its position in the moiety displays significant activity according to the Zerewitinoff test described by Kohler in the *J. Am. Chem. Soc.*, Vol. 49, 3181 (1927). Illustrative of such active hydrogen moieties are, —COOH, —OH, —NH$_2$—, —CONH$_2$, —SH and —CONH—. Alkyleneoxy moiety refers herein to a repeating which has an alkylene group bound to oxygen. Alkylene carbonate and alkyleneoxy moieties are respectively represented by the following formulae:

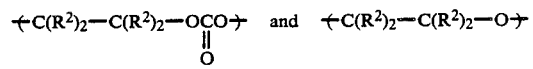

wherein $R^2$ is as hereinafter defined.

Preferred poly(alkylene carbonate) polyahls are random polymers which correspond to the formula

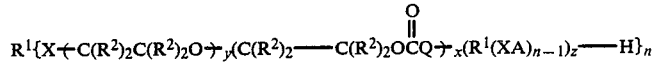

wherein $R^1$ is separately in each occurrence an n-valent hydrocarbon radical or hydrocarbon radical which can contain one or more heteroatoms of O, N or S:

$R^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group:

X is separately in each occurrence S, O, NH,

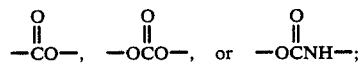

A is separately in each occurrence

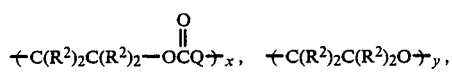

combinations thereof or a covalent bond:

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40:

y is separately in each occurrence an integer of from 1 to 120; and z is separately in each occurrence an integer of from 0 to 5.

A more preferred class are poly(alkylene carbonate) polyols generally corresponding to the aforementioned formula wherein $R^1$, $R^2$ and n are as previously defined wherein X is oxygen:

x is separately in each occurrence an integer from 2 to 10;

y is separately in each occurrence an integer from 5 to 15: and z is an integer from 0 to 2, provided that the ratio of y to x is from 1:1 to 3:1.

Preferred among the above are modified poly(alkylene carbonate) polyols of the invention wherein $R^1$ is hydrogen, $C_{1-20}$ alkyl, $C_{1-20}$ haloalkyl, $C_{1-20}$ alkenyl or phenyl:

X is S, O, or NH: and n is an integer from 1 to 10.

Further preferred random polyol residues of the invention are those wherein $R^1$ is an n-valent alkane or cycloalkane, or an n-valent alkane or cycloalkane containing one or more oxygen, nitrogen, or sulfur moieties;

$R^2$ is hydrogen, methyl or ethyl;

X is O; and n is an integer from 1 to 5.

Still more preferred are the polyol residues wherein $R^1$ is n-valent $C_{1-20}$ alkane or an n-valent $C_{1-10}$ alkane substituted with one or more moieties:

$R^2$ is hydrogen or methyl; and n is 1 or 2.

The most preferred of the polyol residues is wherein $R^2$ is hydrogen

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate) polyols and methods for preparation of these polyols are contained in Maximovich (U.S. Pat. Nos. 3,896,090 and 3,689,462), Springmann (U.S. Pat. No. 3,313,782), Stevens (U.S. Pat. Nos. 3,248,416; 3,248,415; and 3,248,414), and copending application Ser. No. 75,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. Nos. 4,476,293 and 4,191,705, incorporated herein by reference.

The poly(alkylene carbonate) polyahls used as starting materials also contain the residue of an initiator and may also contain unreacted starting materials and other relatively volatile reaction products.

A preferred process for producing poly(alkylene carbonate) polyol starting materials is taught in U.S. Ser. No. 750,362 filed July 1, 1985, which is hereby incorporated by reference in its entirety.

The organic compounds which function suitably as modifiers in the practice of this invention are polyfunctional materials which are reactive with the carbonate and/or active hydrogen moieties of poly(alkylene carbonate) polyahls.

Most polyahls which are suitable as modifiers are reactive with the carbonate moieties of poly(alkylene carbonate) polyahls. Typical polyahls include polyols, polyamines, polyamides, polymercaptans and polyacids.

Preferred modifiers for use in the present invention are those selected from the group consisting of alkylene, aralkylene and cycloalkylene polyahls and alkylene, aralkylene and cycloalkylene polyahls containing one or more oxygen, sulfur or nitrogen atoms in their backbones.

Of the foregoing polyahls, the polyols are preferred as modifiers. Examples of such polyols are the polyol polyethers, hydroxy-functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group, as well as those which contain an amino group and a—SH group, may be used.

Polyether polyols which are most advantageously employed as the modifier in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentanediol, 1,7-heptanediol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)-propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, 3rd Edition, Vol. 18, pp. 624–25 and 638–40, published by Interscience Publishers, Inc., or in U.S. Pat. 1,922,459. Also suitable are polyether polyols and processes for preparing them that are described in Schick, M. J., *Nonionic Surfactants*, Marcel Dekker, Inc., New York (1967), U.S. Pat. Nos 2,891,073; 3,058,921; 2,871,219 and British Patent No. 898,306.

Amines which are optionally reacted with alkylene oxides and other oxiranes form amine-initiated polyols are also suitable modifiers. Such amines include aromatic amines such as aniline, o-chloroaniline, p-aminoaniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylendimine, 1,4-butylenediamine and 1,3-butylenediamine, mixtures thereof and the like.

Polyether polyols which are most preferred as modifiers include the alkylene oxide addition products of water, trimethylolpropane, glycerine, pentaerythritol, sucrose, sorbitol, ethylene glycol, propylene glycol, butylene glycol and blends thereof having hydroxyl equivalent weights of from about 75 to about 5000. Examples include triethylene glycol, tetraethylene glycol, poly(ethylene glycols), dipropylene glycol, tripropylene glycol, poly(propylene glycols), poly(butylene glycols) and poly(tetramethylene glycols).

Other polyols which are particularly useful as modifiers include aliphatic diols such as 1,4-butanediol; 1,6-hexanediol; 1,7-heptanediol; 1,8-octanediol; 1,12-dodecanediol and 1,18-octadecanediol. Aliphatic polyols such as glycerine, trimethylolpropane, erythritol, xylenol, sorbitol, sugars and starches and cycloaliphatic polyols such as dimethylol cyclohexane and 4,8-bis(hydroxymethyl)tricyclo-[5.1.2.0 2,6]decane are also useful. Other suitable polyols include aralkylene polyols such as 4,4'-bis(2-hydroxyethyl)bisphenol A and 4,4'-bis(2-hydroxyethyl)bisphenol F; and polyols with other heteroatoms in their backbone such as 2,2'-thiodiethanol, triethanolamine, diethanolamine and n-methyl diethanolamine.

In one process, the modified poly(alkylene carbonate) polyahls of this invention can be obtained by reacting at least one poly(alkylene carbonate) polyahl with a modifier to form a modified poly(alkylene carbonate) polyahl having an increased molecular weight, and removing at least one gaseous compound other than a monoalkylene glycol from said reaction, said gaseous compound being at least as volatile as a tetraethylene glycol and said modifier (1) having a plurality of moieties that are reactive with the carbonate and/or active hydrogen moieties of the poly(alkylene carbonate) polyahl and (2) being about as volatile or less volatile than the major gaseous compound removed. This process is described in detail in U.S. patent application Ser. No. 799,211 filed on Nov. 18, 1985, which is hereby incorporated by reference in its entirety.

In a second process, the modified poly(alkylene carbonate) polyahls of this invention can be prepared by contacting at least one poly(alkylene carbonate) polyahl with at least one modifier containing two or more active hydrogen moieties, optionally in the presence of a catalytic amount of a catalyst for the reaction of an active moiety of the poly(alkylene carbonate) polyahl with a reactive moiety of the modifier under conditions sufficient to cause reaction between said active moiety of said poly(alkylene carbonate) polyahl and said reactive moiety of said modifier to form a modified poly(alkylene carbonate) polyahl wherein the modifier is chemically bonded to the poly(alkylene carbonate) polyahl backbone. This process is described in detail in U.S. patent application Ser. No. 809,675 filed Dec. 16, 1985, which is hereby incorporated by reference in its entirety.

A preferred class of modified poly(alkylene carbonate) polyahl compositions of this invention are random polymers which correspond to the formula

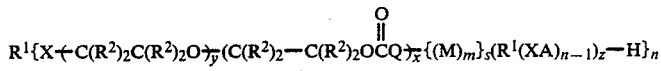

wherein
$R^1$, $R^2$, X, A, Q, n, x, y and z are as previously defined;
M is separately in each occurrence a hydrocarbon radical selected from the group consisting of alkyleneoxy, alkylenethio, alkyleneamino, aralkyleneoxy, aralkylenethio, aralkyleneamino, cycloalkyleneoxy, cycloalkylenethio and cycloalkyleneamino wherein said hydrocarbon radical can also contain one or more additional oxygen, sulfur or nitrogen atoms;
m is separately in each occurrence an integer of from 1 to 40; and
s is separately in each occurrence an integer of from 1 to 10.

A more preferred class are random modified poly(alkylene carbonate) polyols generally corresponding to the aforementioned formula wherein $R^1$, $R^2$ and n are as previously defined
wherein
X is oxygen;
x is separately in each occurrence an integer from 2 to 10;
y is separately in each occurrence an integer from 5 to 15; and
z is an integer from 0 to 2, provided that the ratio of y to x is from 1:1 to 3:1.

Preferred among the above are modified poly(alkylene carbonate) polyols of the invention wherein
$R^1$ is hydrogen, $C_{1-20}$ alkyl, $C_{1-20}$ haloalkyl, $C_{1-20}$ alkenyl or phenyl;
X is S, O or NH;
M is alkyleneoxy, aralkyleneoxy and cycloalkyleneoxy;
n is an integer from 1 to 10; and
m is an integer from 1 to 20.

Further preferred random modified (alkylene carbonate) polyols of the invention are those
wherein
$R^1$ is an n-valent alkane or cycloalkane, or an n-valent alkane or cycloalkane containing one or more oxygen, nitrogen, or sulfur moieties;

$R^2$ is hydrogen, methyl or ethyl;
X is O;
M is alkyleneoxy;
n is an integer from 1 to 5; and
s is an integer from 1 to 5.

Still more preferred are the modified poly(alkylene carbonate) polyols
wherein
$R^1$ is n-valent $C_{1-20}$ alkane or an n-valent $C_{1-10}$ alkane substituted with one or more oxygen moieties;
$R^2$ is hydrogen or methyl;
m is an integer from 1 to 20; and
n is 1 or 2.

The most preferred of the modified poly(alkylene carbonate) polyols is wherein $R^2$ is hydrogen.

Another preferred group of modified poly(alkylene carbonate) polyols of the invention are those random polymers which correspond to the formula

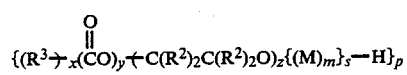

wherein
$R^2$ is as previously defined;
$R^3$ is $R^4$-$X^1$n;
$R^4$ is separately in each occurrence an n-valent hydrogen radical or hydrocarbon radical which contains one or more heteroatoms of O, N or S;
X1 is O, S or NH;
M is separately in each occurrence a hydrocarbon radical selected from the group consisting of alkyleneoxy, aralkyleneoxy and cycloalkyleneoxy;
m is an integer of 1 to 40;
n is separately in each occurrence an integer of from 1 to 25;
p is an integer of 1 or greater;
s is an integer of from 1 to 10;
x is 1;
y is separately in each occurrence 1 to 40; and z is separately in each occurrence 1 to 100.

A still more preferred group of random modified poly(alkylene carbonate) polyols is that corresponding to the above formula and
wherein
$R^2$ is hydrogen, $C_{1-20}$ alkyl, $C_{1-20}$ haloalkyl, $C_{1-20}$ alkenyl or phenyl;
$R^4$ is an aliphatic or cycloaliphatic hydrocarbon or an aliphatic or cycloaliphatic hydrocarbon containing one or more oxygen, sulfur or nitrogen moieties;
M is an alkyleneoxy, aralkyleneoxy or cycloalkyleneoxy radical:
X is S, O, or NH;
m is an integer of 1 to 20, inclusive;
n is an integer of 1 to 10, inclusive;
p is 1 to 10, inclusive;
y is 5 to 20, inclusive; and
z is 20 to 50, inclusive.

An even more preferred group of random modified poly(alkylene carbonate) polyols corresponding to the above formula is that
wherein
$R^2$ is hydrogen, $C_{1-3}$ alkyl, $C_{2-3}$ alkenyl or phenyl;
$R^4$ is an n-valent alkane or cycloalkane or an n-alkane alkane or cycloalkane containing one or more oxygen, sulfur or nitrogen moieties;
m is an integer of 1 to 10, inclusive;
is an integer of 1 to 5, inclusive;
p is an integer of 1 to 5, inclusive; and
s is an integer of from 1 to 5, inclusive.

A yet more preferred group of random modified poly(alkylene carbonate) polyols is that corresponding to the above formula and
wherein
$R_2$ is hydrogen, methyl or ethyl;
$R_4$ is an n-valent $C_{1-10}$ alkane: and
n is 1 or 2.

The novel, modified poly(alkylene carbonate) polyahl compositions of this invention contain several key components in their backbones. The residue of at least one polyahl initiator is present, typically, as the result of the particular initiator employed to make the starting material, the poly(alkylene carbonate) polyahl.

The poly(alkyleneoxy) moieties and the poly(alkylene carbonate) moieties are also present in the backbone of the poly(alkylene carbonate) polyahl starting material.

The plurality of active hydrogen end groups present in the modified poly(alkylene carbonate) polyahl are in part due to end groups resulting from reaction of the modifier with the poly(alkylene carbonate) polyahl, in part from end groups of the poly(alkylene carbonate) polyahl, and in part from end groups present on the modifier. If all end groups on the modifier react into the polymer backbone, then none of the modifier end groups will be present as end groups in the product. On the other hand, if some end groups on the modifier remain unreacted after incorporation of the modifier into the polymer backbone, then the resultant polymer will have some end groups derived from the modifier.

Reaction is thought to occur mainly between an active hydrogen moiety on the modifier and a carbonate moiety on the poly(alkylene carbonate) polyahl. Such reaction occurs, in general, without loss of carbon dioxide content in the polymer backbone. If residual catalyst is present and at higher temperatures, some loss of carbon dioxide content can occur.

Molecular weight of a modified poly(alkylene carbonate) polyahl product is controlled by the reaction conditions used and by the type and quantity of the modifier used. Under the conditions used in the prior art, molecular weights have been controlled by the stoichiometry of the reactants. Initiators have been used to build molecular weight by reaction with materials such as aryl carbonates, alkyl carbonates, cyclic oarbonates and alkylene oxides and carbon dioxide. The molecular weight of the poly(alkylene carbonate) polyahl and the weight percent initiator in the polymer backbone are interdependent using prior art processes. As larger amounts of a given initiator are employed, the molecular weight of the resultant polymer decreases. This is due to the larger proportion of chain ends present at higher initiator levels.

Figure 1:
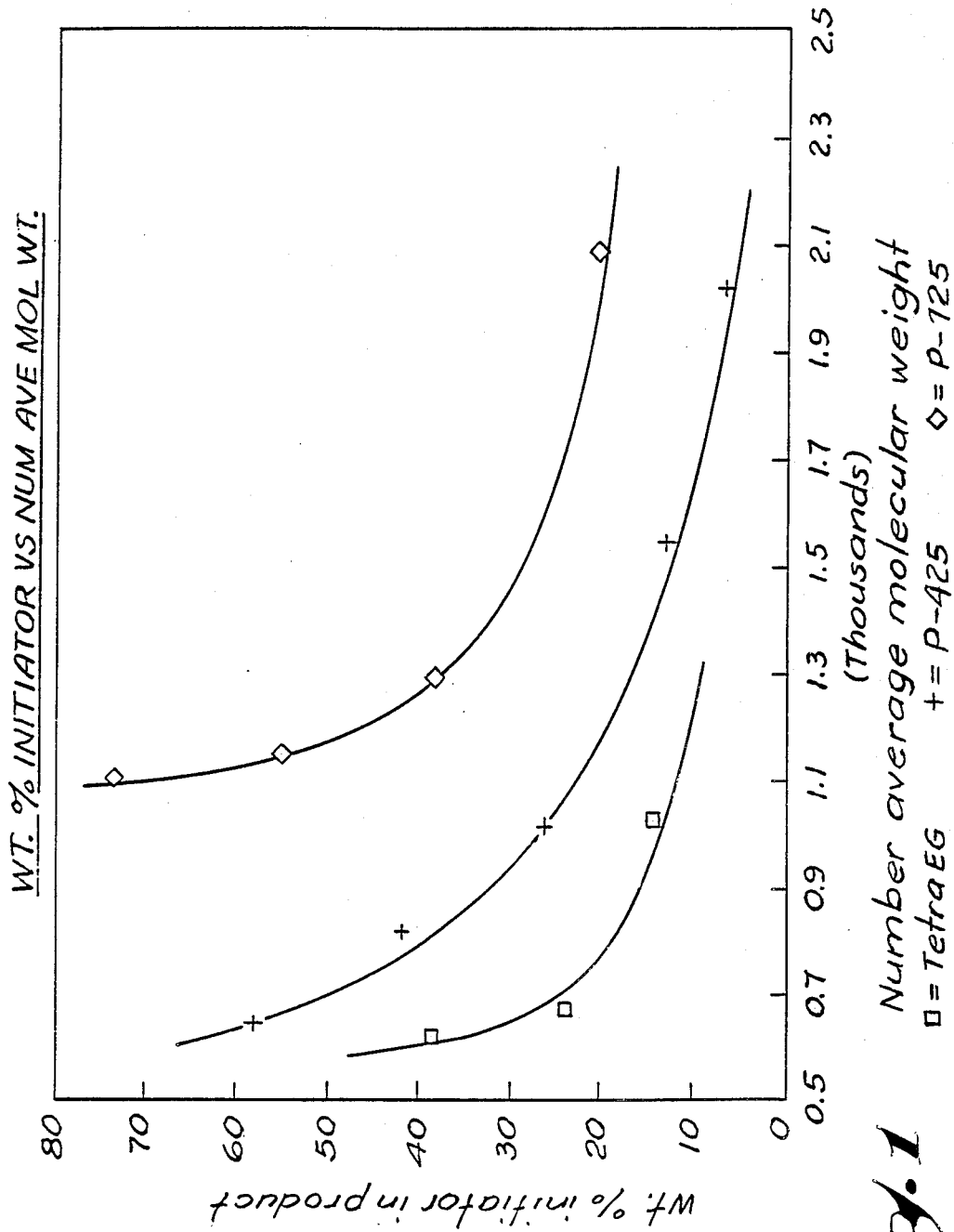
FIG. 1 illustrates this effect for differing amounts different initiators—tetraethylene glycol (molecular weight=194), P-425 (molecular weight=425) and P-725 (molecular weight =725). A plot of weight percent initiator vs number average molecular weight with these three different initiators shows the general effect that as initiator levels are increased, molecular weight is decreased.

Due to this interdependence of weight percent initiator on molecular weight, prior to the present invention, it has not been possible to make materials with both high initiator levels and high molecular weights. Initiators and modifiers can be the same materials chemically, but have different names due to their different functions in a particular process. An initiator is used to initiate a reaction between monomers to produce polymeric materials. A modifier is used to react with a polymer to change its backbone composition.

In the current invention all compositions above and to the right of a given weight percent initiator vs molecular weight curve (as illustrated in FIG. 1) are novel compositions of matter. The relationship between the weight percent initiator and the molecular weight is dependent on the molecular weight of the initiator and its functionality. For example, one data point on the P-425 curve represents a composition containing 42.0 weight percent P-425 (as defined in Example 1) in the backbone of a poly(ethylene carbonate) polyol with a $\overline{M}n$ of 817. If one attempts to increase the P-425 content, the result is a lower molecular weight material. However, compositions with 42.0 weight percent P-425 can take on any molecular weight greater than 817 and become novel compositions of this invention. This is made possible by the novel processes of U.S. patent application Ser. Nos. 799,211 and 809,675 as described hereinbefore.

The amount of modifier in the modified poly(alkylene carbonate) polyahl compositions can vary over a wide range so long as it is sufficient to produce the desired increase in molecular weight. A preferred range of modifier is from about 5 to about 80 weight percent modifier based on the weight of the modified poly(alkylene carbonate) polyahl product; a more preferred range is from about 7 to about 65 weight percent modifier and a most preferred range is from about 10 to about 50 weight percent modifier.

The carbon dioxide content of the modified poly(alkylene carbonate) polyahl compositions can vary over a wide range to provide the desired property improvement over a polyether. A preferred range of carbon dioxide contents is from about 5 to about 30 weight percent carbon dioxide based on the weight of the modified poly(alkylene carbonate) polyahl product; a more preferred range is from about 7 to about 25 weight percent carbon dioxide and a most preferred range is from about 10 to about 22 weight percent carbon dioxide.

The molecular weight of the modified poly(alkylene carbonate) polyahl product can vary over a wide range. Preferred molecular weights ($\overline{M}n$) are between about 500 and about 20,000; a more preferred range is from 800 to 10,000 and the most preferred range is from 1,000 to 8,000 with the proviso that the molecular weight is higher than any known poly(alkylene carbonate) polyahl containing at least the same weight percent modifier and the same poly(alkylene carbonate) and poly(alkyleneoxy) residues.

In general, the viscosity of a modified poly(alkylene carbonate) polyahl is considerably lower than the viscosity of the corresponding unmodified poly(alkylene carbonate) polyahl. This makes the modified poly(alkylene carbonate) polyahls much easier to handle.

In a second aspect, this invention includes isocyanate-functional prepolymer compositions of the novel modified poly(alkylene carbonate) polyahl compositions of this invention formed by the reactions of these modified poly(alkylene carbonate) polyahls with excess polyisocyanates.

The polyisocyanates suitable for these reactions include aliphatic, cycloaliphatic, araliphatic, aromatic and heterocyclio polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisooyanate and mixtures of these isomers; 1-isocyanato-3,3,5-trimethyl-5-isocyanato methyl cyclohexane (see, e.g., German Auslegeschrift No. 1,202,785): 2,4- and 2,6-hexahydrotolylene diisocyanate and mixtures of these isomers, hexahydro-1,3- and/or 1,4-phenylene diisocyanate, perhydro-2,5'- and/or 4,4'-diphenylmethane diisocyanate, 1,3- and 1,4-phenylene diisocyanate, 2,4- and 2,60 -tolylene diisocyanate and mixtures of these isomers, diphenyl methane-2,4'- and/or 4,4'-diisocyanate, naphthylene-1,5-diisocyanate, triphenyl methane-4,4', 4''-triisocyanate, polyphenyl polymethylene polyisocyanates of the type obtained by condensing aniline with formaldehyde, followed by phosgenation and such as described, for example, in British Patent Nos. 874,430 and 848,671, perchlorinated aryl polyisocyanates of the type described in German Auslegeschrift No. 1,157,601, polyisocyanates containing carbodiimide groups of the type described in German Patent No. 1,092,007, diisocyanates of the type described in U.S. Pat. No. 3,492,330, polyisocyanates containing allophanate groups of the type described, for example, in British Pat. No. 994,890, in Belgian Pat. No. 761,626 and in published Dutch Patent Application No. 7,102,524, polyisocyanates containing isocyanurate groups of the type described in German Pat. Nos. 1,022,789; 1,222,067 and 1,027,394 and in German Offenlegungsschrift No. 1,929,034 and 2,004,048, polyisocyanates containing urethane groups of the type described, for example, in Belgian Pat. No. 752,261 or in U.S. Pat. No. 3,394,164, polyisocyanates containing acrylated urea groups as described in German Pat. No. 1,230,778, polyisocyanates containing biuret groups of the type described, for example, in German Pat. No. 1,101,392, in British Pat. No. 889,050 and in French Pat. No. 7,017,514, polyisocyanates obtained by telomerization reactions of the type described, for example, in Belgian Pat. No. 723,640, polyisocyanates containing ester groups of the type described, for example, in British Pat. Nos. 965,474 and 1,072,956, in U.S. Pat. No. 3,567,763 and in German Pat. No. 1,231,688 and reaction products of the aforementioned isocyanates with acetals as described in German Pat. No. 1,072,385.

It is also possible to use the distillation residues containing isocyanate groups accumulating in the commercial production of isocyanates, optionally in solution in one or more of the aforementioned polyisocyanates In addition, it is possible to use mixtures of the aforementioned polyisocyanates.

Additional polyisocyanates suitable for use in this invention include those described by W. Siefken in *Justus Liebigs Annalen der Chemie*, 562, 75–136 and in U.S. Pat. Nos. 3,284,479; 4,089,835; 4,093,569; 4,221,876; 4,310,448: 4,359,550 and 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI (e.g., pure MDI, quasi- and prepolymers of MDI, modified pure MDI, etc.). Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst.

The isocyanate-functional prepolymers of this invention can be made by addition of excess polyisocyanates to the modified poly(alkylene carbonate) polyahls of this invention or by addition of the modified poly(alkylene carbonate) polyahls of this invention to excess polyisocyanates. The preparation of isocyanate-functional prepolymers with prior art polyahls is well-known in the art. Examples can be found in U.S. Pat. Nos. 4,108,842; 4,125,522 and 4,476,292, the relevant portions of which are hereby incorporated by reference.

In a third aspect, this invention includes novel urethane/urea polymers formed by the reactions of the isocyanate-functional prepolymer compositions based on the novel, modified poly(alkylene carbonate) polyahls of this invention with polyahls; many of these polyahls are commonly called chain-extenders when used with isocyanate-functional prepolymers. Optionally, catalysts and a variety of additives can be included.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyolohexanediol and 1,4-cyclohexanedimethanol; aromatic ring-containing diols such as bishydroxyethylhydroquinone; amide or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine; 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309 and 4,218,543.

Catalysts such as tertiary amines or an organic tin compound or other polyurethane catalysts may be used. The organic tin compound may suitably be a stannous or stannic compound, such as stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of $\beta$-(3,5-di-tertbutyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerthritol, tris-hydroxyethyl isocyanurate, and dihydroxyethyl oxalic acid diamide; UV absorbers and light stabilizers such as 2-(2'-hydroxyphenyl)benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-striazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone); plasticizers such as phthalates, adipates, glutarates, epoxidized vegetable oils, and the like; fungicides; pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.95:1.00 to 1.00:1.05; more preferred is an isocyanate:polyahl equivalent ratio of from 0.97:1.00 to 1.00:1.03; most preferred is a ratio of 1.00:1.00 to 1.00:1.03.

In a fourth aspect, this invention includes novel, urethane/urea polymers formed by the reactions of the modified poly(alkylene carbonate) polyahls of this invention with polyisocyanates, optionally in the presence of other polyahls. Optionally, catalysts and a variety of additives can be included. Useful polyisocyanates, catalysts and additives are those that have been defined hereinbefore.

Approximately stoichiometric amounts of the isocyanate moieties on the polyisocyanates and the total active hydrogen moieties on the modified poly(alkylene carbonate) polyahls and other polyahls, if employed, are used. The equivalent ratio of isocyanate moieties to total active hydrogen moieties is between about 0.95:1.00 to 1.00:1.05; more preferred is an isocyanate-:active hydrogen equivalent ratio of from 0.97:1.00 to 1.00:1.03; most preferred is a ratio of 1.00:1.00 to 1.00:1.03. The preparation of urethane/urea polymers is well-known in the art. Examples of typical reaction conditions employed can be found in U.S. Pat. Nos. 4,460,715 and 4,394,491, the relevant portions of which are hereby incorporated by reference.

The urethane/urea polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309).

SPECIFIC EMBODIMENTS

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ®1000 Å and 10,000 Å columns in series using tetrahydrofuran (THF) as the mobile phase and calibrated with narrow molecular weight poly(ethylene glycol) standards.

The Brookfield viscosities are all measured at ambient temperature using an LV4 spindle at the appropriate spin rate.

Distillate samples are analyzed by capillary gas chromatography on a Hewlett-Packard 5840A unit equipped with a J&W Scientific Company DB-1 fused silica capillary column using flame ionization detection.

EXAMPLE 1

Preparation of a Modified Poly(Ethylene Carbonate) Polyol Containing 48.4 Weight Percent P-425 as Modifier A 10:1 mole ratio of ethylene carbonate to polyglycol P-425 (a poly(propylene glycol) with a molecular weight of 425; manufactured by The Dow Chemical Company) is heated with stirring under a nitrogen atmosphere for 6 hours at 175° C. using 0.5 weight percent sodium stannate trihydrate as catalyst to give 98 percent ethylene carbonate conversion to a low molecular weight poly(ethylene carbonate) polyol modified with P-425. The product contains 10.8 weight percent carbon dioxide and 42.0 weight percent P-425. The catalyst is removed as described in U.S. Pat. No. 4,528,364. The product (20 weight percent in acetone) is stirred with Florisil (1 g/10 g product) for 3 hours to adsorb the catalyst, followed by filtration to remove the catalyst and Florisil and concentration to remove the acetone.

A portion of the product (81.8 g) and boiling stones (0.2 g) are combined in a 100-ml flask equipped with a thermometer, temperature controlled and a simple take-off head with a water-chilled condenser (about 15° C.) attached to a vacuum source through a dry ice-isopropanol (about −78° C.) trap. The flask is then heated to a maximum pot temperature of 230° C. and a pressure of 10 mm Hg over a 3.5-hour period. The distillate collected at 15° C accounts for 9.8 weight percent (8.0 g) of the sample charged and has the following assay:
0 1.02 percent monoethylene glycol,
5.40 percent ethylene carbonate,
76.9 percent diethylene glycol, and
8.13 percent triethylene glycol.

The distillate collected at −78° C. accounts for 2.5 weight percent (2.1 g) of the sample charged and has the following assay;
69.1 percent acetone, and
24.7 percent dioxane.

The residue is a light straw, viscous liquid with 12.7 weight percent carbon dioxide, accounts for 86.8 weight percent (71.0 g) of the sample charged and has the properties described in Table I hereinbelow.

TABLE I

Composition and Molecular Weight Data for the Product of Example 1

| | Residue (wt %) | P-425 (wt %) | $CO_2$ (wt %) | Molecular Weight | | | |
|---|---|---|---|---|---|---|---|
| | | | | Peak | $\overline{Mn}$ | $\overline{Mw}$ | PDI |
| Before Advancement | — | 42.0 | 10.8 | 1323 | 817 | 1562 | 1.91 |
| After Advancement | 86.8 | 48.4 | 12.7 | 3021 | 1870 | 3891 | 2.08 |

Carbon-13 nuclear magnetic resonance shows that this material contains carbonate, polyethyleneoxy and polypropyleneoxy moieties in its backbone.

This example shows that a poly(ethylene carbonate) polyol formed using P-425 as initiator can be advanced to a modified poly(ethylene carbonate) polyol containing a high P-425 content (48.4 weight percent) and a high molecular weight ($\overline{Mn}$ of 1870). A material containing such high P-425 content would have a much lower molecular weight if prepared by known methods.

EXAMPLE 2

Preparation of a Series of P-425 Modified Poly(Ethylene Carbonate) Polyols with Increasing Molecular Weight The low molecular weight poly(ethylene carbonate) polyol (95.4 g) of Example 1 (material before advancement) and boiling stones (0.2 g) are combined in the same equipment of Example 1. The flask is then heated at 10 mm Hg vacuum while increasing the reactor temperature. Samples are removed from the reactor at various times to follow the molecular weight advancement. Results are given in Table II hereinbelow.

TABLE II

Molecular Weight Data for the Product of Example 2

| Sample Number | Reactor Temperature (°C.) | Molecular Weight | | | |
|---|---|---|---|---|---|
| | | Peak | $\overline{Mn}$ | $\overline{Mw}$ | PDI |
| 1 | starting material | 1323 | 817 | 1562 | 1.91 |
| 2 | 180 | 1706 | 1105 | 2092 | 1.89 |
| 3 | 195 | 1968 | 1279 | 2357 | 1.84 |
| 4 | 208 | 2270 | 1457 | 2808 | 1.93 |
| 5 | 220 | 3021 | 1746 | 3523 | 2.02 |
| 6 | 230 | 3415 | 1949 | 4049 | 2.08 |
| 7 | 240 | 4271 | 2238 | 4757 | 2.13 |
| 8 | 250 | 4923 | 2373 | 5383 | 2.27 |
| 9 | 260 | 5337 | 2674 | 6038 | 2.26 |

This example shows that a poly(ethylene carbonate) polyol containing 42.0 weight percent P-425 can be advanced to a series of modified materials with increasing molecular weight while retaining P-425 in the polymer backbone. Materials with such high P-425 content would have much lower molecular weights if prepared by known methods

EXAMPLE 3

Preparation of a Modified Poly(Ethylene Carbonate) Polyol Containing 10.8 Weight Percent Dipropylene Glycol as Modifier A 10:1 mole ratio of ethylene carbonate to dipropylene glycol is heated with stirring under a nitrogen atmosphere for 4 hours at 175° C. using 0.5 percent sodium stannate trihydrate as catalyst to give 100 percent ethylene carbonate conversion to a low molecular weight poly(ethylene carbonate) polyol modified with dipropylene glycol. The product contains 14.7 weight percent $CO_2$ and 19.0 weight percent dipropylene glycol. The catalyst is removed as in Example 1.

A portion of the product (89.5 g) and boiling stones (0.2 g) are combined in the equipment of Example 1. The flask is then heated to a maximum pot temperature of 235° C. and a pressure of 10 mm Hg over a 4.0-hour period The distillate collected in a water-chilled condenser accounts for 20.2 weight percent (18.1 g) of the sample charged and has the following assay:
0.91 percent dioxane,
39.4 percent diethylene glycol,
55.8 percent dipropylene glycol, and
0.30 percent triethylene glycol.

The distillate collected in a dry ice-isopropanol trap accounts for 4.0 weight percent (3.6 g) of the sample charged and has the following assay:
24.2 percent acetone, and
61.3 percent dioxane The residue is a straw-colored, viscous liquid with 20.5 weight percent carbon dioxide, accounts for 71.5 weight percent (64.0 g) of the sample charged and has the properties described in Table III hereinbelow.

TABLE III

Composition and Molecular Weight Data for the Product of Example 3

| | Residue (wt %) | DPG (wt %) | $CO_2$ (wt %) | Molecular Weight | | | |
|---|---|---|---|---|---|---|---|
| | | | | Peak | $\overline{Mn}$ | $\overline{Mw}$ | PDI |
| Before Advancement | — | 19.0 | 14.7 | 794 | 461 | 870 | 1.89 |
| After Advancement | 71.5 | 10.8 | 20.5 | 3485 | 1921 | 3817 | 1.99 |

This example shows that a poly(ethylene carbonate) polyol formed using dipropylene glycol as initiator can be advanced to a modified poly(ethylene carbonate) polyol containing 10.8 weight percent dipropylene glycol and a high molecular weight ($\overline{Mn}$ of 1921). A material containing this dipropylene glycol content would have a much lower molecular weight if prepared by known methods.

EXAMPLE 4

Preparation of a Modified Poly(Ethylene Carbonate) Polyol Containing 27.0 Weight Percent Tripropylene Glycol as Modifier A 10:1 mole ratio of ethylene carbonate to tripropylene glycol is heated with stirring under a nitrogen atmosphere for 5 hours at 175° C. using 0.5 weight percent sodium stannate trihydrate as catalyst to give 98 percent ethylene carbonate conversion to a low molecular weight poly(ethylene carbonate) polyol modified with tripropylene glycol. The product contains 17.5 weight percent carbon dioxide and 31.5 weight percent tripropylene glycol. The catalyst is removed as in Example 1.

A portion of the product (450.3 g) and boiling stones (0.2 g) are combined in a 500-ml, 3-necked boiling flask equipped with a thermometer, temperature controller and a down draft water-chilled condenser attached to a vacuum source through a dry ice-isopropanol trap (about −78° C.). The flask is heated to a pot temperature of 235° C. over a period of 3 hours at 10 mm Hg vacuum. The distillate in the water-chilled condenser accounts for 26.0 weight percent (117.0 g) of the sample charged and has the following assay:
0.69 percent dioxane,
0.65 percent ethylene carbonate,
36.8 percent diethylene glycol,
6.94 percent triethylene glycol, and
45.2 percent tripropylene glycol.

The distillate collected at −78° C. accounts for 0.7 weight percent (3.3 g) of the sample charged and has the following assay:
42.3 percent acetone,
42.2 percent dioxane, and
6.5 percent water.

The residue is a light amber, viscous liquid containing 27.0 weight percent tripropylene glycol, 20.4 weight percent carbon dioxide, has a Brookfield viscosity of 137,000 cps at 25° C., represents 73.0 weight percent (328.8 g) of the sample charged and has the properties described in Table IV hereinbelow.

TABLE IV

Composition and Molecular Weight Data for the Product of Example 4

| | Residue (wt %) | TPG (wt %) | $CO_2$ (wt %) | Molecular Weight | | | |
|---|---|---|---|---|---|---|---|
| | | | | Peak | $\overline{Mn}$ | $\overline{Mw}$ | PDI |
| Before Advancement | — | 31.5 | 17.6 | 843 | 564 | 1009 | 1.79 |
| After Advancement | 73.0 | 27.0 | 20.4 | 5820 | 2674 | 5924 | 2.22 |

Carbon-13 nuclear magnetic resonance shows that this material contains carbonate, polyethyleneoxy and polypropyleneoxy moieties in its backbone. The tripropylene glycol is chemically incorporated into the polymer backbone.

This example shows that a modified poly(ethylene carbonate) polyol can be formed with a high tripropylene glycol content (27.0 percent) and a high molecular weight ($\overline{Mn}$ of 2674). A material containing such a high tripropylene glycol content would have much lower molecular weight if prepared by known methods.

EXAMPLE 5

Preparation of 1,6-Hexanediol Modified Poly(Ethylene Carbonate) Polyols

A 10:1 mole ratio of ethylene carbonate to 1,6-hexanediol is heated with stirring under a nitrogen atmosphere for 3 hours at 175° C. using 0.5 weight percent sodium stannate trihydrate as catalyst to give 97.2 percent ethylene carbonate conversion to a low molecular weight poly(alkylene carbonate) polyol modified with 1,6-hexanediol. The product contains 24.5 weight percent carbon dioxide and 16.0 weight percent 1,6-hexanediol. The catalyst is removed as in Example 1.

A portion of the product (450.3 g) and boiling stones (0.2 g) are combined in the equipment used in Example 4. The flask is then heated to a pot temperature of 230° C. over a period of 3 hours at 10 mm Hg vacuum. The distillate collected in the water-chilled condenser accounts for 17.7 weight percent (79.5 g) of the sample charged and has the following assay:
1.47 percent dioxane,
2.59 percent ethylene carbonate,
82.7 percent diethylene glycol,
7.17 percent triethylene glycol, and
5.32 percent 1,6-hexanediol.

The distillate collected at −78° C. accounts for 1.3 weight percent (5.9 g) of the sample charged and has the following assay:
41.4 percent acetone,
46.5 percent dioxane, and
5.1 percent water.

The residue is a straw-colored, viscous liquid containing 18.7 weight percent 1,6-hexanediol and 28.8 weight percent carbon dioxide, has a Brookfield viscosity of 282,400 cps at 25° C, represents 80.4 weight percent (362.1 g) of the sample charged and has the properties described in Table Va hereinbelow.

TABLE Va

Composition and Molecular Weight Data for the Advancement Product

| | Residue (wt %) | 1,6-Hexanediol (wt %) | CO$_2$ (wt %) | Molecular Weight | | | |
| --- | --- | --- | --- | --- | --- | --- | --- |
| | | | | Peak | $\overline{Mn}$ | $\overline{Mw}$ | PDI |
| Before Advancement | — | 16.0 | 24.5 | 983 | 731 | 1297 | 1.78 |
| After Advancement | 80.4 | 18.7 | 28.8 | 6529 | 3049 | 6732 | 2.21 |

The viscous liquid product obtained above (323.8 g) and 1,6-hexanediol (9.40 g) are combined and heated with stirring under nitrogen at 175° C. for one hour to reduce the molecular weight and increase the 1,6-hexanediol content by transesterification. The resultant straw-colored, viscous liquid contains 21.0 weight percent 1,6-hexanediol, 26.2 weight percent carbon dioxide, has a Brookfield viscosity of 61,400 cps at 25° C. and has the properties described in Table Vb hereinbelow.

TABLE Vb

Composition and Molecular Weight Data for the Transesterification Product

| | 1,6-Hexanediol (wt %) | CO$_2$ (wt %) | Molecular Weight | | | |
| --- | --- | --- | --- | --- | --- | --- |
| | | | Peak | $\overline{Mn}$ | $\overline{Mw}$ | PDI |
| Before Transesterification | 18.7 | 28.8 | 6529 | 3049 | 6732 | 2.21 |
| After Transesterification | 21.0 | 26.2 | 3775 | 2015 | 4252 | 2.11 |

Carbon-13 nuclear magnetic resonance shows that this material contains carbonate, polyethyleneoxy and 1,6-polymethylene moieties in its backbone. The 1,6-hexanediol is chemically incorporated into the polymer backbone.

This example shows that a modified poly(ethylene carbonate) polyol can be formed with a high 1,6-hexanediol content (18.7 percent) and a high molecular weight ($\overline{Mn}$ of 3049). By transesterification with additional 1,6-hexanediol, a second modified poly(ethylene carbonate) polyol is formed with a higher 1,6-hexanediol content (21.0 percent) and high molecular weight ($\overline{Mn}$ of 2015). Both materials containing such high 1,6-hexanediol contents would have much lower molecular weights if prepared by known methods.

EXAMPLE 6

Preparation of a Modified Poly(Ethylene Carbonate) Polyol Containing 51.2 Weight Percent P-425 as Modifier A low molecular weight ($\overline{Mn}$ of 618) poly(ethylene carbonate) polyol (551.5 g), P-425 (352.0 g) and boiling stones (0.2 g) are combined in the equipment used in Example 4, except that a 1000-ml boiling flask is used. The flask is then heated to a pot temperature of 235° C. over a period of 3 hours at 10 mm Hg vacuum. The distillate collected in the water-chilled condenser accounts for 22.5 weight percent (203.0 g) of the sample charged and has the following assay:
density 1,12,
0.67 weight percent dioxane,
2.48 weight percent carbonate,
78.0 weight percent diethylene glycol,
0.35 weight percent tetraethylene glycol.

The distillate collected at −78° C. accounts for 1.0 weight percent (9.3 g) of the sample charged and has the following assay:
28.7 weight percent acetone,
54.6 weight percent dioxane, and
9.7 weight percent water.

The residue is a light straw, viscous liquid containing 51.2 weight percent P-425, 15.3 weight percent CO$_2$, has a Brookfield viscosity of 23,200 cps at 25° C., represents 76.1 weight percent (687.6 g) of the sample charged and has the properties described in Table VI.

TABLE VI

Composition and Molecular Weight Data for the Product of Example 6

| | Residue (wt %) | P-425 (wt %) | CO$_2$ (wt %) | Molecular Weight | | | |
| --- | --- | --- | --- | --- | --- | --- | --- |
| | | | | Peak | $\overline{Mn}$ | $\overline{Mw}$ | PDI |
| Before Advancement | — | — | 21.7 | 784 | 618 | 1016 | 1.64 |
| After Advancement | 76.1 | 51.2 | 15.3 | 4760 | 2545 | 5667 | 2.23 |

The $\overline{Mn}$ by end group (OH) titration is 2625. Carbon-13 nuclear magnetic resonance shows that this material contains carbonate, polyethyleneoxy and polypropyleneoxy moieties in its backbone. The P-425 is chemically incorporated into the polymer backbone.

The example shows that a modified poly(ethylene carbonate) polyol can be formed with a high P-425 content (51.2 percent) and a high molecular weight ($\overline{Mn}$ of 2545). A material containing such high P-425 content would have much lower molecular weight if prepared by known methods.

EXAMPLE 7

Preparation of a Modified Poly(Ethylene Carbonate) Polyol Containing 25.2 Weight Percent P-425 as Modifier A low molecular weight ($\overline{M}n$ of 603) poly(ethylene carbonate) polyol (425.0 g), P-425 (100.0 g) and boiling stones (0.2 g) are combined in the same equipment as used in Example 4. The flask is then heated to 235° C. over a period of 3.0 hours at 10 mm Hg vacuum. The distillate collected in the water-chilled condenser accounts for 19.5 weight percent (102.6 g) of the sample charged and has the following assay:
density 1.12,
0.35 weight percent monoethylene glycol,
0.66 weight percent dioxane,
7.93 weight percent ethylene carbonate,
79.8 weight percent diethylene glycol,
7.67 weight percent triethylene glycol,
0.35 weight percent tetraethylene glycol, and
0.06 weight percent water.

The distillate collected at $-78°$ C. accounts for 4.2 weight percent (21.9 g) of the sample charged and has the following assay:
60.7 percent acetone,
21.7 percent dioxane, and
13.0 percent water.

The residue is a light straw, viscous liquid containing 25.2 weight percent P-425, 23.2 weight percent $CO_2$, represents 75.7 weight percent (397.6 g) of the sample charged and has the properties described in Table VII hereinbelow.

EXAMPLE 8

Preparation of a Modified Poly(Ethylene Carbonate) Polyol Containing 23.7 Weight Percent P-725 as Modifier The low molecular weight poly(ethylene carbonate) polyol (425.0 g) used in Example 7, P-725 (100.0 g), a poly(propylene glycol) with a $\overline{M}n$ of 725 (manufactured by Union Carbide Corporation), and boiling stones (0.2 g) are combined in the equipment used in Example 4. The flask is then heated to a pot temperature of 225° C for a period of 2.5 hours at 10 mm Hg vacuum. The distillate collected in the water-chilled condenser accounts for 15.5 weight percent (81.6 g) of the sample charged and has the following assay:
density, 1.13,
0.72 weight percent monoethylene glycol,
0.76 weight percent dioxane,
9.19 weight percent ethylene carbonate,
79.8 weight percent diethylene glycol,
6.51 weight percent triethylene glycol,
0.08 weight percent water.

The distillate collected at $-78°$ C. accounts for 4.1 weight percent (21.3 g) of the sample charged and has the following assay:
63.6 weight percent acetone,
18.8 weight percent dioxane, and
13.7 weight percent water.

The residue is a light amber, viscous liquid representing 80.0 weight percent (420.0 g) of the sample charged, contains 23.7 weight percent P-725, 23.7 weight percent $CO_2$ and has the properties described in Table VIII hereinbelow.

TABLE VII

Composition, Viscosity and Molecular Weight Data for the Product of Example 7

| | Residue (wt %) | P-425 (wt %) | $CO_2$ (wt %) | Viscosity (cps) | | | Molecular Weight | | | |
|---|---|---|---|---|---|---|---|---|---|---|
| | | | | 25° C. | 50° C. | 90° C. | Peak | $\overline{M}n$ | $\overline{M}w$ | PDI |
| Before Advancement | — | — | 21.9 | 980 | 185 | 37 | 950 | 603 | 1080 | 1.79 |
| After Advancement | 75.7 | 25.2 | 23.2 | 68,000 | 8800 | 1100 | 4230 | 2317 | 5481 | 2.37 |

The $\overline{M}n$ by end group (OH) titration is 2466. Carbon-13 nuclear magnetic resonance shows that this material contains carbonate, polyethyleneoxy and polypropyleneoxy moieties in its backbone. The P-425 is chemically incorporated into the polymer backbone.

This example shows that a modified poly(ethylene carbonate) polyol can be formed with a high P-425 content (25.2 percent) and a high molecular weight ($\overline{M}n$ of 2317). A material containing such a high P-425 content would have much lower molecular weight if prepared by known methods.

TABLE VIII

Composition, Viscosity and Molecular Weight Data for the Product of Example 8

| | Residue (wt %) | P-725 (wt %) | $CO_2$ (wt %) | Viscosity (cps) | | | Molecular Weight | | | |
|---|---|---|---|---|---|---|---|---|---|---|
| | | | | 25° C. | 50° C. | 90° C. | Peak | $\overline{M}n$ | $\overline{M}w$ | PDI |
| Before Advancement | — | — | 21.7 | 980 | 185 | 37 | 950 | 603 | 1080 | 1.79 |
| After Advancement | 80.8 | 23.7 | 23.7 | 37,000 | 5400 | 600 | 4356 | 1921 | 4555 | 2.37 |

The $\overline{M}n$ by end group (OH) titration is 1977. Carbon-13 nuclear magnetic resonance shows that this material contains carbonate, polyethyleneoxy and polypropyleneoxy moieties in its backbone. The P-725 is chemically incorporated into the polymer backbone.

This example shows that a modified poly(ethylene carbonate) polyol can be formed with a high P-725 content (23.7 percent) and a high molecular weight ($\overline{M}n$ of 1921). A material containing such a high P-725 content would have much lower molecular weight if prepared by known methods.

EXAMPLE 9

Preparation of a Modified Poly(Ethylene Carbonate) Polyol Containing 49.1 Weight Percent P-725 as Modifier The low molecular weight poly(ethylene carbonate) polyol (540.0 g) used in Example 6, P-725 (375.1 g) and boiling stones (0.2 g) are combined in the same equipment as used in Example 6. The flask is then heated to a pot temperature of 225° C. for a period of 2.5 hours at 10 mm Hg vacuum. The distillate collected in the water-chilled condenser accounts for 15.7 weight percent (143.2 g) of the sample charged and has the following assay:
density 1.12,
0.33 weight percent monoethylene glycol,
0.47 weight percent dioxane,
3.47 weight percent ethylene carbonate,
86.4 weight percent diethylene glycol,
9.69 weight percent triethylene glycol,
0.27 weight percent tetraethylene glycol, and
0.04 weight percent water.

The distillate collected at −78° C. accounts for 0.7 weight percent (6.7 g) of the sample charged and has the following assay:
34.4 weight percent acetone,
37.1 weight percent dioxane, and
13.6 weight percent water.

The residue is a light straw, viscous liquid representing 83.5 weight percent (764.1) of the sample charged, contains 49.1 weight percent P-725, 13.5 weight percent $CO_2$ and has the properties described in Table IX hereinbelow.

TABLE IX

Composition and Molecular Weight Data for the Product of Example 9

| | Residue (wt %) | P-725 (wt %) | $CO_2$ (wt %) | Molecular Weight | | | |
| --- | --- | --- | --- | --- | --- | --- | --- |
| | | | | Peak | $\overline{Mn}$ | $\overline{Mw}$ | PDI |
| Before Advancement | — | — | 21.7 | 784 | 618 | 1016 | 1.64 |
| After Advancement | 83.5 | 49.1 | 14.5 | 3768 | 2413 | 5225 | 2.17 |

The $\overline{Mn}$ by end group (OH) titration is 2447. Carbon-13 nuclear magnetic resonance shows that this material contains carbonate, polyethyleneoxy and polypropyleneoxy moieties in its backbone. The P-725 is chemically incorporated into the polymer backbone.

This example shows that modified poly(ethylene carbonate) polyol can be formed with a high P-725 content (49.1 percent) and a high molecular weight ($\overline{Mn}$ of 2413). A material containing such a high P-725 content would have much lower molecular weight if prepared by known methods.

EXAMPLE 10

Preparation of a Modified Poly(Ethylene Carbonate) Polyol Containing 72.1 Weight Percent P-725 as Modifier A low molecular weight ($\overline{Mn}$ of 638) poly(ethylene carbonate) polyol (187.2 g), P-725 (308.7 g) and boiling stones (0.2 g) are combined in the equipment used in Example 4. The flask is then heated to 216° C. for a period of 2 hours at 10 mm Hg vacuum. The distillate collected in the water-chilled condenser accounts for 11.7 weight percent (58.0 g) of the sample charged and has the following assay:
density 1.12,
0.28 weight percent monoethylene glycol,
0.60 weight percent dioxane,
7.17 weight percent ethylene carbonate,
75.2 weight percent diethylene glycol,
8.87 weight percent triethylene glycol,
0.40 weight percent tetraethylene glycol, and
0.04 weight percent water.

The distillate collected at −78° C. accounts for 1.7 weight percent (8.2 g) of the sample charged and has the following assay:
76.7 weight percent acetone,
13.9 weight percent dioxane, and
2.3 weight percent water.

The residue is a light straw, viscous liquid representing 86.3 weight percent (428 1 g) of the sample charged, contains 72.1 weight percent P-725, 7.7 weight percent $CO_2$ and has the properties described in Table X hereinbelow.

TABLE X

Composition, Viscosity and Molecular Weight Data for the Product of Example 10

| | Residue (wt %) | P-725 (wt %) | $CO_2$ (wt %) | Viscosity (cps) | | | Molecular Weight | | | |
| --- | --- | --- | --- | --- | --- | --- | --- | --- | --- | --- |
| | | | | 25° C. | 50° C. | 90° C. | Peak | $\overline{Mn}$ | $\overline{Mw}$ | PDI |
| Before Advancement | — | — | 20.0 | 1100 | 190 | 35 | 1050 | 638 | 1169 | 1.83 |
| After Advancement | 86.3 | 72.1 | 7.7 | 2600 | 600 | 110 | 3742 | 1904 | 3905 | 2.05 |

The $\overline{Mn}$ by end group (OH) titration is 1907. Carbon-13 nuclear magnetic resonance shows that this material contains carbonate, polyethyleneoxy and polypropyleneoxy moieties in its backbone.

This example shows that a modified poly(ethylene carbonate) polyol can be formed with a very high P-725 content (72.1 percent) and a high molecular weight ($\overline{Mn}$ of 1904). A material containing such a high P-725 content would have much lower molecular weight if prepared by known methods.

EXAMPLE 11

Preparation of a Series of P-725 Modified Poly(Ethylene Carbonate) Polyols with Increasing Molecular Weight The low molecular weight poly(ethylene carbonate) polyol (34.8 g) used in Example 10, P-725 (52.2 g) and boiling stones (0.2 g) are combined in the equipment used in Example 1. The flask is then heated at 10 mm Hg while increasing the reactor temperature. Samples are removed from the reactor at various times to measure the molecular weight advancement. Samples are also removed from water-chilled distillate to determine distillate composition. The results are given in Table XI hereinbelow.

TABLE XI
Composition and Molecular Weight Data on the Distillate of Example 11

| Sample Reactor | Reactor Temp (°C.) | Distillate[1] (wt %) | Distillate Assay[2] | | | | | | Molecular Weight | | | |
|---|---|---|---|---|---|---|---|---|---|---|---|---|
| | | | MEG | Dioxane | EC | DEG | TriEG | TetraEG | Peak | $\overline{M}w$ | $\overline{M}w$ | PDI |
| 1 | 25  | 0    | —    | —    | —    | —    | —    | —  | 1060 | 638  | 1169 | 1.83 |
| 2 | 165 | 1.7  | 1.46 | —    | 24.2 | 62.9 | 0.92 | —  | 969  | 808  | 1506 | 1.86 |
| 3 | 176 | 4.3  | —    | —    | 5.20 | 82.1 | 3.04 | —  | 1050 | 940  | 1895 | 2.21 |
| 4 | 188 | 7.2  | —    | —    | 0.67 | 89.3 | 4.25 | —  | 2224 | 1183 | 2490 | 2.10 |
| 5 | 205 | 10.1 | —    | 0.57 | —    | 87.3 | 4.48 | Tr | 3212 | 1545 | 3606 | 2.33 |
| 6 | 220 | 11.7 | —    | 1.03 | —    | 85.2 | 3.95 | Tr | 3781 | 2012 | 4720 | 2.35 |
| 7 | 235 | 12.8 | —    | 1.92 | —    | 80.9 | 4.64 | 0.63 | 4101 | 2362 | 5692 | 2.41 |
| 8 | 250 | 14.1 | —    | 3.36 | —    | 74.4 | 5.44 | 1.04 | 5903 | 2742 | 7186 | 2.62 |
| 9 | 260 | 15.3 | —    | 3.72 | —    | 65.2 | 6.32 | 1.77 | 5903 | 2935 | 7541 | 2.57 |

[1] Amount of material in water-chilled condenser, normalized to total reactants charged to the reactor.
[2] Compounds analyzed by capillary gas chromatography on a Hewlett-Packard 5840 A unit equipped with J & W Scientific Company DB-1 fused silica capillary column, flame ionization detection. MEG - monoethylene glycol, dioxane, 1,4-dioxane, EC - ethylene carbonate, DEG - diethylene glycol, TriEG - triethylene glycol, TetraEG - tetraethylene glycol.

This example illustrates the systematic increase in molecular weight as the pot temperature is increased and the distillate is removed. It also illustrates that diethylene glycol is the major component of the distillate. Triethylene glycol and tetraethylene glycol become important components in the distillate at higher temperatures. Carbon-13 nuclear magnetic resonance shows that the product contains carbonate, polyethyleneoxy and polypropyleneoxy moieties in its backbone.

This example shows that a series of modified poly(ethylene carbonate) polyols can be formed with increasing molecular weight while retaining P-725 in the polymer backbone. Materials with such high P-725 contents would have much lower molecular weights if prepared by known methods.

EXAMPLE 12

Preparation of a Modified Poly(Ethylene Carbonate) Polyol Containing 51.7 Weight Percent P-725 as Modifier (Mole. Wt.=4582)

The low molecular weight poly(ethylene carbonate) polyol (540.3 g) used in Example 10, P-725 (360.1 g) and boiling stones (0.2 g) are combined in the equipment used in Example 6. The flask is then heated to a pot temperature of 252° C. over a period of 2.8 hours at 10 mm Hg vacuum. The distillate collected in the water-chilled condenser accounts for 20.1 weight percent (180.9 g) of the sample charged and has the following assay:
1.41 weight percent dioxane,
1.30 weight percent ethylene carbonate,
83.0 weight percent diethylene glycol,
11.5 weight percent triethylene glycol, and
0.35 weight percent tetraethylene glycol.

The distillate collected at −78° C. accounts for 1.4 weight percent (12.9 g) of the sample charged and has the following assay:
15.5 weight percent acetone,
69.6 weight percent dioxane, and
14.8 weight percent water.

The residue is a yellow, viscous liquid containing 51.7 weight percent P-725, 13.0 weight percent C02, represents 77.4 weight percent (696.7 g) of the sample charged and has the properties described in Table XII hereinbelow.

TABLE XII
Composition, Viscosity and Molecular Weight Data for the Product of Example 12

| | Residue (wt %) | P-725 (wt %) | $CO_2$ (wt %) | Viscosity (cps) | | | Molecular Weight | | | |
|---|---|---|---|---|---|---|---|---|---|---|
| | | | | 25° C. | 50° C. | 90° C. | Peak | $\overline{M}n$ | $\overline{M}w$ | PDI |
| Before Advancement | — | — | 20.0 | 1,100 | 190 | 35 | 1050 | 638 | 1169 | 1.83 |
| After Advancement | 77.4 | 51.7 | 13.0 | 32,000 | 5400 | 700 | 6458 | 3794 | 7809 | 2.06 |

The $\overline{M}n$ by end group (OH) titration is 4582. Carbon-13 nuclear magnetic resonance shows that this material contains carbonate, polyethyleneoxy and polypropyleneoxy moieties in its backbone. The P-725 is chemically incorporated into the polymer backbone.

This example shows that a modified poly(ethylene carbonate) polyol can be formed with a high P-725 content (51.7 percent) and a high molecular weight ($\overline{M}n$ of 3794). A material containing such a high P-725 content would have much lower molecular weight if prepared by known methods.

EXAMPLE 13

Preparation of a Modified Poly(Ethylene Carbonate) Polyol Containing 72.3 Weight Percent P-1200 as Modifier The low molecular weight poly(ethylene carbonate) polyol (184.8 g) used in Example 10, P-1200 (310.1 g), a poly(propylene glycol) with a $\overline{M}n$ of 1200 (manufactured by The Dow Chemical Company), and boiling stones (0.2 g) are combined in the equipment used in Example 4. The flask is then heated to 202° C. over a period of 2 hours at 10 mm Hg vacuum. The distillate collected in the water-chilled condenser accounts for 11.5 weight percent (56.8 g) of the sample charged and has the following assay:

density 1.11,
0.34 weight percent monoethylene carbonate,
60.2 weight percent diethylene glycol,
6.98 weight percent triethylene glycol,
0.54 weight percent tetraethylene glycol, and
0.04 weight percent water.

The distillate collected at −78° C. accounts for 1.6 weight percent (8.0 g) of the sample charged and has the following assay:
7.52 weight percent acetone,
13.0 weight percent dioxane, and
1.8 weight percent water.

The residue is a straw-colored, viscous liquid containing 86.6 weight percent (428.7 g) of the sample charged, contains 72.3 weight percent P-1200, 9.5 weight percent $CO_2$, and has the properties described in Table XIII hereinbelow.

TABLE XIII

Composition and Molecular Weight Data for the Product of Example 13

| | Residue (wt %) | P-1200 (wt %) | $CO_2$ (wt %) | Molecular Weight | | | |
|---|---|---|---|---|---|---|---|
| | | | | Peak | $\overline{Mn}$ | $\overline{Mw}$ | PDI |
| Before Advancement | — | — | 20.0 | 1050 | 638 | 1169 | 1.83 |
| After Advancement | 86.6 | 72.3 | 9.5 | 3850 | 1712 | 4006 | 2.33 |

Carbon-13 nuclear magnetic resonance show that this material contains carbonate, polyethyleneoxy and polypropyleneoxy moieties in its backbone. The P-1200 is chemically incorporated into the polymer backbone.

This example shows that a modified poly(ethylene carbonate) polyol can be formed with a high P-1200 content (72.3 percent) and a high molecular weight ($\overline{Mn}$ of 1712). A material containing such a high P-1200 content would have much lower molecular weight if prepared by known methods.

EXAMPLE 14

Preparation of a Modified Poly(Ethylene Carbonate) Polyol Containing 53.0 Weight Percent B-500 as Modifier A low molecular weight ($\overline{Mn}$ of 664) poly(ethylene carbonate) polyol (540.5 g), B-500 (360.3 g, a poly(1,2-butylene glycol) with a $\overline{Mn}$ of 482 (manufactured by The Dow Chemical Company), and boiling stones (0.2 g) are combined using the reactor set-up as of Example 6. The flask is then heated to a pot temperature of 235° C. over a period of 2.5 hours at 10 mm Hg vacuum. The distillate collected in the water-chilled condenser accounts for 22.3 weight percent (200.9 g) of the sample charged and has the following assay:
1.52 weight percent dioxane,
6.68 weight percent ethylene carbonate,
74.7 weight percent diethylene glycol,
14.9 weight percent triethylene glycol, and
0.51 weight percent tetraethylene glycol.

The distillate collected at −78° C. accounts for 1.5 weight percent (13.3 g) of the sample charged and has the following assay:
30.9 weight percent acetone,
50.9 weight percent dioxane, and
6.3 weight percent water.

The residue is a light yellow, viscous liquid containing 53.0 weight percent B-500, 12.4 weight percent $CO_2$, having a Brookfield viscosity of 14,820 cps at 23° C., represents 75.4 weight percent (679.0 g) of the sample charged and has the properties described in Table XIV hereinbelow.

TABLE XIV

Composition and Molecular Weight Data for the Product of Example 14

| | Residue (wt %) | B-500 (wt %) | Molecular Weight | | | |
|---|---|---|---|---|---|---|
| | | | Peak | $\overline{Mn}$ | $\overline{Mw}$ | PDI |
| Before Advancement | — | — | 871 | 664 | 1085 | 1.64 |
| After Advancement | 75.4 | 53.0 | 3156 | 1933 | 4238 | 2.19 |
| B-500 | — | 100.0 | 498 | 482 | 537 | 1.12 |

The $\overline{Mn}$ by end group (OH) titration is 2386. Carbon-13 nuclear magnetic resonance shows that this material contains carbonate, polyethyleneoxy and polybutyleneoxy moieties in its backbone. The B-500 is chemically incorporated into the polymer backbone.

This example shows that a modified poly(ethylene carbonate) polyol can be formed with a high B-500 content (53.0 percent) and a high molecular weight ($\overline{Mn}$ of 1933). A material containing such a high B-500 content would have much lower molecular weight if prepared by known methods.

EXAMPLE 15

Preparation of a Modified Poly(Ethylene Carbonate) Polyol Containing 52.6 Weight Percent B-700 as Modifier The low molecular weight poly(ethylene carbonate) polyol (530.3 g) used in Example 14, B-700 (380.2 g, a poly(1,2-butylene glycol) with a $\overline{Mn}$ of 700 (manufactured by The Dow Chemical Company), and boiling stones (0.2 g) are combined using the reactor set-up of Example 6. The flask is then heated to a pot temperature of 225° C. over a period of 2 hours at 10 mm Hg vacuum. The distillate collected in the water-chilled condenser accounts for 19.3 weight percent (175.3 g) of the sample charged and has the following assay:
0.72 weight percent dioxane,
6.15 weight percent ethylene carbonate,
73.0 weight percent diethylene glycol,
16.1 weight percent triethylene glycol, and
0.71 weight percent tetraethylene glycol.

The distillate collected at −78° C. accounts for 1.0 weight percent (9.4 g) of the sample charged and has the following assay:
42.2 weight percent acetone,
40.9 weight percent dioxane, and
10.0 weight percent water.

The residue is a light straw, viscous liquid containing 52.6 weight percent B-700, 11.9 weight percent $CO_2$, having a Brookfield viscosity of 23,450 cps at 23° C., represents 79.4 weight percent (722.7 g) of the sample charged and has the properties described in Table XV hereinbelow.

TABLE XV

Composition and Molecular Weight Data for the Product of Example 15

| | Residue (wt %) | B-700 (wt %) | Peak | $\overline{Mn}$ | $\overline{Mw}$ | PDI |
|---|---|---|---|---|---|---|
| | | | | Molecular Weight | | |
| Before | — | — | 871 | 664 | 1085 | 1.63 |
| After Advancement | 79.4 | 52.6 | 4405 | 2230 | 5152 | 2.21 |

The $\overline{Mn}$ by end group (OH) titration is 2530. Carbon-13 nuclear magnetic resonance shows that this material contains carbonate, polyethyleneoxy and polybutyleneoxy moieties in its backbone. The B-700 is chemically incorporated into the polymer backbone.

This example shows that a modified poly(ethylene carbonate) polyol can be formed with a high B-700 content (52.6 percent) and a high molecular weight ($\overline{Mn}$ of 2230). A material containing such a high B-700 content would have much lower molecular weight if prepared by known methods.

EXAMPLE 16

Preparation of a Modified Poly(Ethylene Carbonate) Polyol Containing 25.5 Weight Percent E-400 as Modifier The low molecular weight poly(ethylene carbonate) polyol (410.4 g) used in Example 10, E-400 (95.4 g, a poly(ethylene glycol) with a $\overline{Mn}$ of 400 manufactured by The Dow Chemical Company), and boiling stones (0.2 g) are combined in the same equipment as used in Example 4. The flask is then heated to a pot temperature of 235° C. over a period of 2.5 hours at 10 mm Hg vacuum. The distillate collected in the water-chilled condenser accounts for 20.2 weight percent (102.2 g) of the sample charged and has the following assay:
density 1.13,
0.33 weight percent monoethylene glycol,
1.89 weight percent dioxane,
8.59 weight percent ethylene carbonate,
74.1 weight percent diethylene glycol,
8.01 weight percent triethylene glycol,
0.51 weight percent tetraethylene glycol, and
0.03 weight percent water.
The distillate collected at −78° C. accounts for 4.3 weight percent (21.8 g) of the sample charged and has the following assay:
59.1 weight percent acetone,
32.8 weight percent dioxane, and
1.7 weight percent water.
The residue is an amber, viscous liquid representing 74.1 weight percent (374.5 g) of the sample charged, contains 25.5 weight percent E-400, 25.9 weight percent $CO_2$, and has the properties described in Table XVI hereinbelow.

TABLE XVI

Composition, Viscosity and Molecular Weight Data for the Product of Example 16

| | Residue (wt %) | E-400 (wt %) | $CO_2$ (wt %) | Viscosity (cps) 25° C. | 50° C. | 90° C. | Peak | $\overline{Mn}$ | $\overline{Mw}$ | PDI |
|---|---|---|---|---|---|---|---|---|---|---|
| Before Advancement | — | — | 20.0 | 1,100 | 900 | 35 | 1050 | 638 | 1169 | 1.83 |
| After Advancement | 74.1 | 25.5 | 25.9 | 93,000 | 13,000 | 2000 | 7042 | 2988 | 6547 | 2.19 |

The $\overline{Mn}$ by end group (OH) titration is 3207. Carbon-13 nuclear magnetic resonance shows that this material contains carbonate and polyethyleneoxy moieties in its backbone. The E-400 is chemically incorporated into the polymer backbone This example shows that a modified poly(ethylene carbonate) polyol can be formed with a high E-400 content (25.5 percent) and a high molecular weight ($\overline{Mn}$ of 3207). A material containing such a high E-400 content would have much lower molecular weight if prepared by known methods.

EXAMPLE 17

Preparation of a Modified Poly(Ethylene Carbonate) Polyol Containing 50.8 Weight Percent E-400 as Modifier The low molecular weight poly(ethylene carbonate) polyol (304.2 g) used in Example 10, E-400 20 (190.1 g, a poly(ethylene glycol) with a $\overline{Mn}$ of 400 (manufactured by The Dow Chemical Company), and boiling stones (0.2 g) are combined in the same equipment as used in Example 4. The flask is then heated to 230° C. over a period of 2 hours at 10 mm Hg vacuum. The distillate collected in the water-chilled condenser accounts for 20.2 weight percent (99.9 g) of the sample charged and has the following assay:
density 1.12,
0.41 weight percent monoethylene glycol,
0.99 weight percent dioxane,
6.75 weight percent ethylene carbonate,
8.1??? weight percent diethylene glycol,
9.06 weight percent triethylene glycol,
0.55 weight percent tetraethylene glycol, and
0.03 weight percent water.
. The distillate collected at −78° C. accounts for 3.1 weight percent (15.4 g) of the sample charged and has the following assay:
64.0 weight percent acetone,
27.5 weight percent dioxane, and
The residue is an amber, viscous liquid representing 75.8 weight percent (374.5 g) of the sample charged, contains 50.8 weight percent E-400, 16.5 weight percent $CO_2$, and has the properties described in Table XVII hereinbelow.

TABLE XVII

Composition, Viscosity and Molecular Weight Data for the Product of Example 17

| | Residue (wt %) | E-400 (wt %) | $CO_2$ (wt %) | Viscosity (cps) 25° C. | 50° C. | 90° C. | Molecular Weight Peak | $\overline{Mn}$ | $\overline{Mw}$ | PDI |
|---|---|---|---|---|---|---|---|---|---|---|
| Before Advancement | — | — | 20.0 | 1,100 | 900 | 35 | 1050 | 638 | 1169 | 1.83 |
| After Advancement | 75.8 | 50.8 | 16.5 | 17,500 | 3000 | 470 | 4542 | 2063 | 4682 | 2.26 |

The $\overline{Mn}$ by end group (OH) titration is 2337. Carbon-13 nuclear magnetic resonance shows that this material contains carbonate and polyethyleneoxy moieties in its backbone The E-400 is chemically incorporated into the polymer backbone.

This example shows that a modified poly(ethylene carbonate) polyol can be formed with a high E-400 content (50.8 percent) and a high molecular weight ($\overline{Mn}$ of 2063). A material containing such a high E-400 content would have much lower molecular weight if prepared by known methods.

EXAMPLE 18

Preparation of a Modified Poly(Ethylene Carbonate) Polyol Containing 55.8 Weight Percent Tetraethylene Glycol as Modifier The low molecular weight poly(ethylene carbonate) polyol (301 g) used in Example 10, tetraethylene glycol (190.2 g) and boiling stones (0.2 g) are combined in the same equipment as used in Example 4. The flask is then heated to 235° C. over a period of 2.5 hours at 10 mm Hg vacuum. The distillate collected in the water-chilled condenser accounts for 35.0 weight percent (171.8 g) of the sample charged and has the following assay: density 1.12,
0.37 weight percent monoethylene glycol,
0.59 weight percent dioxane,
3.70 weight percent ethylene carbonate,
68.4 weight percent diethylene glycol,
10.2 weight percent triethylene glycol,
12.94 weight percent tetraethylene glycol, and
0.02 weight percent water.

The distillate collected at −78° C. accounts for 2.9 weight percent (14.2 g) of the sample charged and has the following assay:
69.9 weight percent acetone,
21.4 weight percent dioxane, and
2.6 weight percent water.

The residue is an amber, viscous liquid representing 61.2 weight percent (300.9 g) of the sample charged, contains 55.8 weight percent tetraethylene glycol, 20.4 weight percent $CO_2$, and has the properties described in Table XVIII hereinbelow.

TABLE XVIII

Composition, Viscosity and Molecular Weight Data for the Product of Example 18

| | Residue (wt %) | Tetra-EG (wt %) | $CO_2$ (wt %) | Viscosity (cps) 25° C. | 50° C. | 90° C. | Molecular Weight Peak | $\overline{Mn}$ | $\overline{Mw}$ | PDI |
|---|---|---|---|---|---|---|---|---|---|---|
| Before Advancement | — | — | 20.0 | 1,100 | 190 | 35 | 1050 | 638 | 1169 | 1.83 |
| After Advancement | 61.2 | 55.8 | 20.4 | 26,500 | 4200 | 580 | 4650 | 2162 | 4759 | 2.20 |

The $\overline{Mn}$ by end group (OH) titration is 2331. Carbon-13 nuclear magnetic resonance shows that this material contains carbonate and polyethyleneoxy moieties in its backbone. The tetraethylene glycol is chemically incorporated into the polymer backbone.

This example shows that a modified poly(ethylene carbonate) polyol can be formed with a high tetraethylene glycol content (55.8 percent) and a high molecular weight ($\overline{Mn}$ of 2162). A material containing this tetraethylene glycol content would have much lower molecular weight if prepared by known methods.

EXAMPLE 19

Preparation of a Modified Poly(Ethylene Carbonate) Polyol Containing 62.0 Weight Percent Triethylene Glycol as Modifier The low molecular weight ($\overline{Mn}$ of 643) poly(ethylene carbonate) polyol (66.0 g), triethylene glycol (22.0 g) and boiling stones (0.2 g) are combined using the same equipment as Example 1. The reactor is then heated at 10 mm Hg vacuum while increasing the reactor temperature. The distillate is removed and analyzed at various times during the reaction to check for the presence of the modifier, triethylene glycol. The distillate collected at −78° C. accounts for 3.0 weight percent (2.6 g) of the sample charged and has the following assay: 94.3 weight percent dioxane.

The distillate collected in the water-chilled condenser represents 32.3 weight percent (28.4 g) of the sample charged. The composition as a function of the port temperature is illustrated in Table XIXa hereinbelow.

TABLE XIXa

Composition of the Distillate of Example XIX as a Function of Temperature

| Sample Number | Pot Temp (°C.) | Distil- late (g) | Distillate Assay | | | | | Total TriEG Present in Distillate (wt %) |
|---|---|---|---|---|---|---|---|---|
| | | | MEG | Dioxane | EC | DEG | TriEG | |
| 1 | 153 | 0 | 0 | 0 | 0 | 0 | 0 | 0 |
| 2 | 156 | 4.2 | 2.71 | 0 | 14.9 | 76.0 | 6.36 | 0.7 |
| 3 | 166 | 10.8 | 0.82 | 0 | 3.11 | 86.3 | 9.79 | 2.4 |
| 4 | 176 | 15.9 | 0.61 | 0 | 0 | 88.2 | 11.1 | 3.8 |
| 5 | 191 | 20.4 | 0 | 1.00 | 0 | 88.9 | 10.1 | 5.0 |
| 6 | 220 | 25.5 | 0 | 1.46 | 0 | 75.9 | 18.4 | 7.4 |
| 7 | 242 | 28.2 | 0 | 4.71 | 0 | 62.6 | 15.8 | 8.6 |

The residue is a light amber, viscous liquid representing 64.1 weight percent (65.4 g) of the sample charged, contains 62.0 weight percent triethylene glycol and has the properties described in Table XIXb hereinbelow.

TABLE XIXb

Composition and Molecular Weight Data for the Product of Example 19

| | Resi- due (wt %) | TriEG (wt %) | Molecular Weight | | | |
|---|---|---|---|---|---|---|
| | | | Peak | $\overline{M}n$ | $\overline{M}w$ | PDI |
| Before Advancement | — | — | 1029 | 643 | 1179 | 1.84 |
| After Advancement | 64.1 | 62.0 | 5525 | 2234 | 5360 | 2.40 |

Carbon-13 nuclear magnetic resonance shows that this material contains carbonate and polyethyleneoxy moieties in its backbone. The triethylene glycol is chemically incorporated into the polymer backbone.

This example shows that a modified poly(ethylene carbonate) polyol can be formed with a high triethylene glycol content (62.0 percent) and a high molecular weight ($\overline{M}n$ of 2234). A material containing this triethylene glycol content would have much lower molecular weight if prepared by known methods.

EXAMPLE 20

Preparation of a Modified Poly(Ethylene Carbonate) Polyol Containing 29.0 Weight Percent Tripropylene Glycol as Modifier A low molecular weight ($\overline{M}n$ of 664) poly(ethylene carbonate) polyol (67.3 g), tripropylene glycol (22.4 g) and boiling stones (0.2 g) are combined using the reactor set as used in Example 1 except that a short glass column (10 mm × 120 mm) packed with stainless steel helices is attached to the reactor to provide some fractionation of the distillate. The reactor is then heated at 30 mm Hg vacuum to a pot temperature of 220° C. The distillate is removed and analyzed at various times during the reaction to check for the presence of the modifier, tripropylene glycol. The distillate collected at −78° C. accounts for 5.1 weight percent (4.6 g) of the sample charged and has the following assay:
56.8 weight percent acetone, and
42.1 weight percent dioxane.

The distillate collected in the water-chilled condenser accounts for 18.8 weight percent (16.9 g) of the sample charged. The composition as a function of temperature is shown in Table XXa hereinbelow.

TABLE XXa

Composition of the Distillate of Example XX as a Function of Temperature

| Sample Number | Pot Temp (°C.) | Distil- late (g) | Distillate Assay | | | | | | Total TPG Present in Distillate (wt %) |
|---|---|---|---|---|---|---|---|---|---|
| | | | MEG | Dioxane | EC | DEG | TirEG | TPG | |
| 1 | 182 | 0 | 0 | 0 | 0 | 0 | 0 | 0 | 0 |
| 2 | 186 | 2.3 | 9.83 | 1.93 | 25.2 | 44.5 | 0 | 7.05 | 0.7 |
| 3 | 196 | 6.6 | 0.83 | 0.63 | 0 | 72.0 | 0 | 24.1 | 5.4 |
| 4 | 202 | 11.3 | 0.53 | 1.24 | 0 | 72.3 | 0 | 24.9 | 10.6 |
| 5 | 220 | 16.9 | 0.28 | 1.56 | 0 | 71.5 | 0 | 20.8 | 15.8 |

The residue is a light yellow, viscous liquid representing 72.6 weight percent (65.1 g) of the sample charged, contains 29.0 weight percent tripropylene glycol, 20.4 percent $CO_2$, has a Brookfield viscosity of 137,000 cps and has the following properties described in Table XXb hereinbelow.

TABLE XXb

Composition and Molecular Weight Data for the Product of Example 20

| | Resi- due (wt %) | TPG (wt %) | Molecular Weight | | | |
|---|---|---|---|---|---|---|
| | | | Peak | $\overline{M}n$ | $\overline{M}w$ | PDI |
| Before Advancement | — | — | 1115 | 664 | 1230 | 1.85 |
| After Advancement | 72.6 | 29.0 | 1250 | 779 | 1482 | 1.90 |

Carbon-13 nuclear magnetic resonance shows that this material contains carbonate, polyethyleneoxy and polypropyleneoxy moieties in its backbone. The tripropylene glycol is chemically incorporated into the polymer backbone.

This example shows that a modified poly(ethylene carbonate) polyol can be formed with a high tripropylene glycol content (29.0 percent) and a high molecular weight ($\overline{M}n$ of 779). A material containing this tripropylene glycol content would have a lower molecular weight if prepared by known methods.

EXAMPLE 21

Preparation of a Modified Poly(Ethylene Carbonate) Polyol Containing 31.6 Weight Percent 1,6-Hexanediol as Modifier A molecular weight ($\overline{M}n$ of 643) poly(ethylene carbonate) polyol (66.2 g), 1,6-hexanediol (22.0 g) and boiling stones (0.2 g) are combined using the reactor set up used in Example 1. The reactor is then heated using a staged reduction in pressure while increasing the reactor temperature. The distillate is removed and analyzed at various times during the reaction to check for the presence of the modifier: 1,6-hexanediol. The distillate collected at −78° C. accounts for 2.4 weight percent (2.1 g) of the sample charged and has the following assay: 94.9 weight percent dioxane The distillate collected in the water-chilled condenser accounts for 36.3 weight percent (32.0 g) of the sample charged. The composition as a function of pressure and temperature is shown in Table XXIa hereinbelow.

1,6-hexanediol content would have a much lower molecular weight if prepared by known methods.

EXAMPLE 22

Preparation of a Modified Poly(Ethylene Carbonate) Polyol Containing 60.2 Weight Percent 4,8-Bis(Hydroxymethyl)tricyclo-[5.2.1.0$^{2,6}$]decane as Modifier A low molecular weight ($\overline{M}n$ of 664) poly(ethylene carbonate) polyol (541.4 g), 4,8-bis(hydroxymethyl)-tricyclo-[5.2.1.0$^{2,6}$]decane (361.5 g) and boiling stones (0.2 g) are combined using the reactor set up of Example 6. The flask is then heated to a pot temperature of 240° C. over a period of 2.5 hours at 10 mm Hg vacuum. The distillate collected in the water-chilled condenser accounts for 35.6 weight percent (321.8 g) of the sample charged and has the following assay:
0.49 weight percent monoethylene glycol,
3.21 weight percent ethylene carbonate,
66.4 weight percent diethylene glycol,
23.1 weight percent triethylene glycol, and
5.5 weight percent 4,4-bis(hydroxymethyl)tricy- TABLE XXIa Composition of the Distillate of Example XXI as a Function of Pressure and Temperature

| Sample Number | Pot Temp (°C.) | Vacuum (mm) | Distillate [1] (g) | Distillate Assay | | | | | | Total 1,6-Hexanediol Charged Present in Distillate (wt %) |
|---|---|---|---|---|---|---|---|---|---|---|
| | | | | MEG | Dioxane | EC | DEG | TriEG | 1,6-Hexanediol | |
| 1 | 184 | 50 | 0 | 0 | 0 | 0 | 0 | 0 | 0 | 0 |
| 2 | 185 | 50 | 0.8 | 3.85 | 2.65 | 7.85 | 58.0 | 2.55 | 22.7 | 0.8 |
| 3 | 189 | 50 | 4.3 | 2.38 | 0.64 | 5.86 | 75.5 | 2.93 | 12.7 | 2.9 |
| 4 | 198 | 50 | 12.1 | 0.75 | 0.82 | 1.83 | 78.3 | 3.94 | 14.3 | 7.9 |
| 5 | 198 | 10 | 27.4 | 0 | 0.58 | 0 | 73.3 | 9.55 | 16.6 | 19.5 |
| 6 | 220 | 10 | 30.8 | 0 | 0.62 | 0 | 73.3 | 9.12 | 15.8 | 21.9 |
| 7 | 240 | 10 | 32.0 | 0 | 1.59 | 0 | 70.0 | 7.61 | 15.2 | 22.8 |

[1] Weight in grams of material in the water-chilled condenser.

The residue is a light yellow, viscous liquid representing 61.1 weight percent (53.7 g) of the sample charged, contains 31.6 weight percent 1,6-hexanediol and has the following properties described in Table XXIb hereinbelow.

TABLE XXIb

Composition and Molecular Weight Data of the Residue of Example 21

| | Residue (wt %) | 1,6-Hexanediol (wt %) | Molecular Weight | | | |
|---|---|---|---|---|---|---|
| | | | Peak | $\overline{M}n$ | $\overline{M}w$ | PDI |
| Before Advancement | — | — | 1029 | 643 | 1179 | 1.84 |
| After Advancement | 61.1 | 31.6 | 5081 | 2684 | 6259 | 2.33 |

Carbon-13 nuclear magnetic resonance shows that this material contains carbonate, polyethyleneoxy and hexamethylene moieties in its backbone. The 1,6-hexanediol is chemically incorporated into the polymer backbone.

This example shows that a modified poly(ethylene carbonate) polyol can be formed with a high 1,6-hexanediol content (31.6 percent) and a high molecular weight ($\overline{M}n$ of 2684). A material containing this high clo[5.2.1.0$^{2,6}$]decane.

The distillate collected at −78° C. accounts for 0.8 weight percent (7.3 g) of the sample charged and has the following assay:
56.7 weight percent acetone,
17.7 weight percent dioxane, and
9.9 weight percent water.

The residue is a very viscous, yellow liquid containing 60.2 weight percent modifier, 8.4 percent $CO_2$, represents 63.3 weight percent (571.5 g) of the sample charged and has the properties described in Table XXII hereinbelow.

TABLE XXII

Composition and Molecular Weight Data of the Residue of Example 22

| | Residue (wt %) | Modifier (wt %) | Molecular Weight | | | |
|---|---|---|---|---|---|---|
| | | | Peak | $\overline{M}n$ | $\overline{M}w$ | PDI |
| Before Advancement | — | — | 871 | 664 | 1085 | 1.63 |
| After Advancement | 63.3 | 60.2 | 3997 | 1950 | 4308 | 2.21 |

Carbon-13 nuclear magnetic resonance shows that this material contains carbonate and polyethyleneoxy moieties in its backbone. The modifier is chemically incorporated into the polymer backbone.

This example shows that a modified poly(ethylene carbonate) polyol can be formed with a high 4,8-bis(hydroxymethyl)tricyclo[5.2.1.0$^{2,6}$]decane content (60.2 percent) and a high molecular weight ($\overline{Mn}$ of 1950). Materials containing this high 4,8-bis(hydroxymethyl)tricyclo[5.2.1.0$^{2,6}$]decane content have not been previously made.

EXAMPLE 23

Preparation of a Modified Poly(Ethylene Carbonate) Polyol Containing 60.5 Weight Percent Hydroquinonebis(2-hydroxyethyl)ether as Modifier The low molecular weight poly(ethylene carbonate) polyol (546.7 g) used in Example 22, hydroquinone-bis(2-hydroxyethyl)ether (360.0 g) and boiling stones (0.2 g) are combined in the reactor set up of Example 6. The flask is then heated to a pot temperature of 240° C. over a period of 2.5 hours at 10 mm Hg vacuum. The distillate collected in the water-chilled condenser accounts for 33.2 weight percent (301.0 g) of the sample charged and has the following assay:
4.10 weight percent ethylene carbonate,
70 8 weight percent diethylene glycol,
21.4 weight percent triethylene glycol, and
1.2 weight percent tetraethylene glycol.

The distillate collected at −78° C. accounts for 0.8 weight percent (7.3 g) of the sample charged and has the following assay:
54.7 weight percent acetone,
18.7 weight percent dioxane, and
21 8 weight percent water.

The residue is a tan solid containing 60.5 weight percent modifier, represents 65.6 weight percent (595.1 g) of the sample charged and has the properties described in Table XXIII hereinbelow.

TABLE XXIII

| | | | | | |
|---|---|---|---|---|---|
| Composition and Molecular Weight Data of the Product of Example 23 | | | | | |
| | Residue (wt %) | Modifier (wt %) | Molecular Weight | | |
| | | | Peak | $\overline{Mn}$ | $\overline{Mw}$ | PDI |
| Before Advancement | — | — | 871 | 664 | 1085 | 1.63 |
| After Advancement | 65.6 | 60.5 | 2746 | 1462 | 3039 | 2.08 |

Carbon-13 nuclear magnetic resonance shows that this material contains carbonate, polyethyleneoxy and aromatic moieties in its backbone. The modifier is chemically incorporated into the polymer backbone.

This example shows that a modified poly(ethylene carbonate) polyol can be formed with a high hydroquinonebis(2-hydroxyethyl)ether content (60.5 percent) 25 and a high molecular weight ($\overline{Mn}$ of 1462). A material containing this hydroquinonebis(2-hydroxyethyl)ether content would have a much lower molecular weight if prepared by known methods.

EXAMPLE 24

Preparation of a Modified Poly(Ethylene Carbonate) Polyol Containing 38.9 Weight Percent Tetraethylene Glycol as Modifier A high molecular weight ($\overline{Mn}$ of 2889) poly(ethylene carbonate) polyol (15.85 g), tetraethylene glycol 10.04 g) and titanium isopropoxide (0.1 g) are combined in a 50-ml flask under a nitrogen cover. The contents of the flask are heated to 175° C. Transesterification is complete to give a modified poly(ethylene carbonate) polyol containing 38.9 weight percent tetraethylene glycol chemically incorporated into the polymer backbone and having the properties described in Table XXIV hereinbelow.

TABLE XXIV

| | | | | | |
|---|---|---|---|---|---|
| Composition and Molecular Weight Data of the Product of Example 24 | | | | | |
| | TertraEG (wt %) | Molecular Weight | | | |
| | | Peak | $\overline{Mn}$ | $\overline{Mw}$ | PDI |
| Starting Material | — | 6219 | 2889 | 4663 | 1.61 |
| Product | 38.9 | 841 | 517 | 848 | 1.64 |

Carbon-13 nuclear magnetic resonance shows that this material contains carbonate and polyethyleneoxy moieties in its backbone.

This example shows that a modified poly(ethylene carbonate) polyol can be formed by transesterifying a poly(ethylene carbonate) polyol with tetraethylene glycol to give a product with a higher combination of molecular weight and tetraethylene glycol content than is possible by known methods.

EXAMPLE 25

Preparation of a Modified Poly(Ethylene Carbonate) Polyol Containing 10.0 Weight Percent 1,4-Butanediol as Modifier A high molecular weight ($\overline{Mn}$ of 3103) poly(ethylene carbonate) polyol (423.3 g), and 1,4-butanediol (47.03 g) are combined in a 500-ml flask under a nitrogen cover. The flask is then heated to 175° C. Transesterification is complete to give a modified poly(ethylene carbonate) polyol containing 10.0 weight percent 1,4-butanediol chemically incorporated into the polymer backbone and having the properties described in Table XXV hereinbelow.

TABLE XXV

| | | | | | |
|---|---|---|---|---|---|
| Composition and Molecular Weight Data of the Product of Example 2 | | | | | |
| | 1,4-Butanediol (wt %) | Molecular Weight | | | |
| | | Peak | $\overline{Mn}$ | $\overline{Mw}$ | PDI |
| Starting Material | — | 6285 | 3103 | 6715 | 2.16 |
| Product | 10.0 | 1397 | 936 | 1653 | 1.77 |

Carbon-13 nuclear magnetic resonance shows that this material contains carbonate, polyethyleneoxy and 1,4-butyleneoxy moieties in its backbone.

This example shows that a modified poly(ethylene carbonate) polyol can be formed by transesterifying a poly(ethylene carbonate) polyol with 1,4-butanediol to give a product with a higher combination of molecular weight and 1,4-butanediol content than is possible by known methods.

EXAMPLE 26

Preparation of a Modified Poly(Ethylene Carbonate) Polyol Containing 25.3 Weight Percent Poly(Tetramethylene Glycol) as Modifier A low molecular weight ($\overline{M}n$ of 810) poly(ethylene carbonate) polyol (753.5 g) made from ethylene oxide and carbon dioxide, poly(tetramethylene glycol) of 650 molecular weight (208.6 g, manufactured by E. I. du-Pont de Nemours & Co.) and boiling stones (0.2 g) are combined using the reactor set up of Example 6. The flask is then heated to a pot temperature of 225° C. over a period of 2 hours at 10 mm Hg vacuum. The distillate collected in the water-chilled condenser accounts for 13.6 weight percent (130.8 g) of the sample charged and has the following assay:

0.14 weight percent monoethylene glycol,
0.59 weight percent dioxane,
6.00 weight percent ethylene carbonate,
51.1 weight percent diethylene glycol,
31.4 weight percent triethylene glycol,
7.95 weight percent tetraethylene glycol, and
0.09 weight percent water.

The distillate collected at $-78°$ C. accounts for 0.3 weight percent (3.2 g) of the sample charged and has the following assay:

24.6 weight percent acetone,
60.1 weight percent dioxane, and
4.7 weight percent water.

The residue is a light amber, viscous liquid containing 25.3 weight percent poly(tetramethylene glycol), 17.9 percent $CO_2$ having a Brookfield viscosity of 14,200 cps at 25° C., represents 85.7 weight percent (824.1 g) of the sample charged and has the properties described in Table XXVI hereinbelow.

TABLE XXVI

Composition and Molecular Weight Data for the Product of Example 26

| | Residue (wt %) | Poly-(Tetramethylene Glycol) (wt %) | $CO_2$ (wt %) | Peak | $\overline{M}n$ | $\overline{M}w$ | PDI |
|---|---|---|---|---|---|---|---|
| | | | | | Molecular Weight | | |
| Before Advancement | — | — | 20.0 | 1037 | 810 | 1383 | 1.71 |
| After Advancement | 85.7 | 25.3 | 17.9 | 4790 | 2555 | 6061 | 2.37 |

The $\overline{M}n$ by end group (OH) titration is 1838. Carbon-13 nuclear magnetic resonance shows that this material contains carbonate, polyethyleneoxy and polytetramethyleneoxy moieties in its backbone. The poly(tetramethylene glycol) is chemically incorporated into the polymer backbone.

The example shows that a modified poly(ethylene carbonate) polyol can be formed with a high poly(tetramethylene glycol) content (25.3 percent) and a high molecular weight ($\overline{M}n$ of 1838). A material containing such high poly(tetramethylene glycol) content would have much lower molecular weight if prepared by known methods.

EXAMPLE 27

Preparation of a Modified Poly(Ethylene Carbonate) Polyol Containing 49.3 Weight Percent Poly(Tetramethylene Glycol) as Modifier The low molecular weight poly(ethylene carbonate) polyol (554.0 g) used in Example 26, poly(tetramethylene glycol) (381.0 g) and boiling stones (0.2 g) are combined using the reactor set up of Example 6. The flask is then heated to a pot temperature of 235° C. over a period of 2 hours at 10 mm Hg vacuum. The distillate collected in the water-chilled condenser accounts for 16.5 weight percent (154.6 g) of the sample charged and has the following assay:

0.13 weight percent monoethylene glycol,
0.45 weight percent dioxane,
3.70 weight percent ethylene carbonate,
47.6 weight percent diethylene glycol,
33.5 weight percent triethylene glycol,
8.65 weight percent tetraethylene glycol, and
0.08 weight percent water.

The distillate collected at $-78°$ C. accounts for 0.4 weight percent (3.6 g) of the sample charged and has the following assay:

18.9 weight percent acetone,
62.2 weight percent dioxane, and
2.9 weight percent water.

The residue is a straw-colored, viscous liquid containing 49.3 weight percent poly(tetramethylene glycol), 14.5 percent $CO_2$ having a Brookfield viscosity of 19,720 cps at 25° C., represents 82.7 weight percent (772.9 g) of the sample charged and has the properties described in Table XXVII hereinbelow.

TABLE XXVII

Composition and Molecular Weight Data for the Product of Example 27

| | Residue (wt %) | Poly-(Tetramethylene Glycol) (wt %) | $CO_2$ (wt %) | Peak | $\overline{M}n$ | $\overline{M}w$ | PDI |
|---|---|---|---|---|---|---|---|
| | | | | | Molecular Weight | | |
| Before Advancement | — | — | 20.0 | 1037 | 810 | 1383 | 1.71 |
| After Advancement | 82.7 | 49.3 | 14.5 | 7042 | 3281 | 7932 | 2.42 |

The $\overline{M}n$ by end group (OH) titration is 2775. Carbon-13 nuclear magnetic resonance shows that this material contains carbonate, polyethyleneoxy and polytetramethyleneoxy moieties in its backbone. The poly(tetramethylene glycol) is chemically incorporated into the polymer backbone.

This example shows that a modified poly(ethylene carbonate) polyol can be formed with a high poly(tetramethylene glycol) content (49.3 percent) and a high molecular weight ($\overline{M}n$ of 2775). A material containing such high poly(tetramethylene glycol) content would have much lower molecular weight if prepared by known methods.

EXAMPLE 28

Preparation of a Modified Poly(Ethylene Carbonate) Polyol Containing 7.9 Weight Percent Glycerine as Modifier The low molecular weight poly(ethylene carbonate) polyol (1040.3 g) used in Example 26, glycerine (62.4 g) and boiling stones (0.2 g) are combined using the reactor set up of Example 6. The flask is then heated to a pot temperature of 235° C. over a period of 2 hours at 10 mm Hg vacuum. The distillate collected in the water-chilled condenser accounts for 25.0 weight percent (275.7 g) of the sample charged and has the following assay:
1.22 weight percent monoethylene glycol,
8.03 weight percent dioxane,
1.70 weight percent ethylene carbonate,
49.7 weight percent diethylene glycol,
24.7 weight percent triethylene glycol,
4.74 weight percent tetraethylene glycol, and
0.08 weight percent water.

The distillate collected at −78° C. accounts for 0.3 weight percent (3.5 g) of the sample charged and has the following assay:
2.1 weight percent acetone,
41.5 weight percent dioxane, and
10.4 weight percent water.

The residue is an amber, viscous liquid containing 7.9 weight percent glycerine, 22.8 percent $CO_2$ having a Brookfield viscosity of 22,600 cps at 24° C., represents 71.6 weight percent (789.9 g) of the sample charged and has the properties described in Table XXVIII hereinbelow.

TABLE XXVIII

Composition and Molecular Weight Data for the Product of Example 28

| | Residue (wt %) | Glycerine (wt %) | $CO_2$ (wt %) | Molecular Weight | | | |
|---|---|---|---|---|---|---|---|
| | | | | Peak | $\overline{M}n$ | $\overline{M}w$ | PDI |
| Before Advancement | — | — | 20.0 | 1037 | 810 | 1383 | 1.71 |
| After Advancement | 71.6 | 7.9 | 22.8 | 2572 | 1761 | 3542 | 2.01 |

The $\overline{M}n$ by end group (OH) titration is 1823. Carbon-13 nuclear magnetic resonance shows that this material contains carbonate and polyethyleneoxy moieties in its backbone. The glycerine is chemically incorporated into the polymer backbone.

This example shows that a modified poly(ethylene carbonate) polyol can be formed with a high glycerine content (7.9 percent) and a high molecular weight ($\overline{M}n$ of 1823).

EXAMPLE 29

Preparation of an Isocyanate-Functional Prepolymer

The poly(ethylene carbonate) polyol modified with 49.1 weight percent P-725 prepared in Example 9 (71.90 g) is placed in a 100-ml resin pot equipped with thermometer, overhead stirrer, temperature controlled at 80° C. by an oil bath and maintained under a nitrogen atmosphere. One drop (about 15 mg) of benzoyl chloride is added as a prepolymer stabilizer. The contents of the reactor are equilibrated at 80° C. and the benzoyl chloride dissolved into the polyol by thorough agitation. Freshly distilled 4,4'-methylenedi(phenylisocyanate) (MDI, 43.20 g, Isonate ® 125M, manufactured by The Dow Chemical Company), is added by syringe to the reactor under nitrogen cover. The contents of the reactor are stirred at 80° C. for one hour.

The prepolymer is then analyzed for isocyanate content (ASTM D-1638-74). A sample (1.6079 g) is dissolved in dry dimethylformamide (25 ml), treated with an excess of a standard di-n-butylamine solution in dry toluene (0.2N, 50 ml) for 15 minutes at ambient temperature with stirring and the excess amine titrated using 0.1N HCl. The weight percent isocyanate is found to be 10.48.

This example illustrates the preparation of a novel prepolymer composition in which all of the hydroxyl moieties on a modified poly(ethylene ether carbonate) polyol have been converted to urethane moieties by reaction with excess 4,4'-methylenedi(phenylisocyanate). This NCO-functional prepolymer has an isocyanate content of 10.48 weight percent.

EXAMPLE 30

Preparation of a Urethane Elastomer

The isocyanate-functional prepolymer of Example 29 (104.33 g) is thoroughly degassed under vacuum and quickly poured into a 150-ml plastic cup. Two drops (about 30 mg) of a catalyst solution are added (10.0 weight percent dibutyltin dilaurate in poly(propylene glycol) (molecular weight 2000). 1,4-Butanediol (11.16 g, distilled from $CaH_2$) which had been thoroughly degassed under vacuum is added quickly to give a 1.05 index (molar ratio of isocyanate:hydroxyl=1.05). the mixture is stirred rapidly for 37 seconds and then poured into a preheated mold (6.0"×6.0"×0.125"). The sample is then cured at 121° C. (250° F.) for one hour. An elastomeric polyurethane plaque is obtained upon demolding which has the physical properties described in Table XXIX hereinbelow.

TABLE XXIX

Physical Properties of the Urethane Elastomer of Example 30 (43.6 weight percent Hard Segment)

| Property | Value | Test Procedure |
|---|---|---|
| $\overline{M}n$ | 86,500 | a |
| $\overline{M}w$ | 172,900 | a |
| PDI | 2.00 | a |
| Density | 1.20 g/cc | — |
| Hardness (Shore A) | 97 | ASTM E-140 |
| Hardness (Shore D) | 50 | ASTM E-140 |
| Flexural Modulus | 14,390 | ASTM D-790 |
| Young's Modulus | 12,100 | ASTM D-638 |
| 100% Modulus | 1600 | ASTM D-638 |
| Tensile at Break | 200 | ASTM D-638 |
| % Elongation at Break | 330% | ASTM D-638 |
| Notched Izod | no break | ASTM D-256 |
| Tg | −10° C. | Dynamic Mechanical Thermal Analysis |

[a]-Determined by Size Exclusion Chromatography on Waters Ultrastyragel $10^3$ Å, $10^4$ Å, and $10^5$ Å columns arranged in series using dimethylformamide as the mobile phase and calibrated with polystyrene standards using a refractive index detection.

EXAMPLES 31-43

Additional Prepolymers and Elastomers

A of additional isocyanate-functional prepolymers and their corresponding urethane elastomers are prepared by procedures similar to those of Examples 29 and 30. A summary of these materials is given in Table XXX hereinbelow.

TABLE XXX

Additional Isocyanate-Functional Polymers and Urethane Elastomers of Examples 31-43

| Example Number | Product of Example Number | Modifier | Wt % Modifier | Molecular Weight of Modified Polyol | Wt. % NCO in Prepolymer |
|---|---|---|---|---|---|
| 31 | 8 | P-725 | 23.7 | 1977 | 9.90 |
| 32* | 9 | P-725 | 49.1 | 2477 | 10.48 |
| 33 | 10 | P-725 | 72.1 | 1907 | 9.93 |
| 34 | 7 | P-425 | 25.2 | 2466 | 9.92 |
| 35 | 6 | P-425 | 51.2 | 2625 | 10.45 |
| 36 | 4 | TPG | 27.0 | 2596 | 10.78 |
| 37 | 14 | B-500 | 52.6 | 2386 | 10.44 |
| 38 | 15 | B-700 | 50.8 | 2530 | 10.22 |
| 39 | 16 | E-400 | 25.5 | 3207 | 9.77 |
| 40 | 17 | E-400 | 50.8 | 2337 | 10.62 |
| 41 | 5 | 1,6-Hexanediol | 21.0 | 1669 | 9.44 |
| 42 | 26 | Poly(tetramethylene Glycol) | 25.3 | 2555 | 9.32 |
| 43 | 27 | Poly(tetramethylene Glycol) | 49.3 | 3281 | 10.25 |

The invention now being fully described, it will be apparent to one of ordinary skill in the art that many changes and modifications can be made thereto without departing from the spirit or scope of the invention as set forth herein.

What is claimed is:

1. A urethane/urea polymer comprising the reaction product of at least one organic polyisocyanate and at least one modified poly(alkylene carbonate) polyahl, which modified poly(alkylene carbonate) polyahl is a polymer comprising: (1) a backbone having (a) the residue of at least one polyahl initiator, (b) a plurality of poly(alkyleneoxy) moieties, and (c) a plurality of poly(alkylene carbonate) moieties (2) a plurality of active hydrogen end groups; and (3) the residue of at least one modifier which resides in the polymer in the backbone and/or as an end group; wherein the modifier is selected from the group consisting of alkylene, aralkylene and cycloalkylene polyahls and alkylene, aralkylene and cycloalkylene polyahls containing one or more oxygen, sulfur or nitrogen atoms, said modified poly(alkylene carbonate) polyahls having a number average molecular weight higher than the number average molecular weight of any known poly(alkylene carbonate) polyahl comprising the same monomeric components in the same proportions, said modified poly(alkylene carbonate) polyahls containing at least about 5 weight percent carbon dioxide and at least about 5 weight percent modifier.

2. The urethane/urea polymer of claim 1 wherein the modifier is selected from the group consisting of alkylene, arylalkylene and cycloalkylene polyols and alkylene, aralkylene and cycloalkylene polyols containing one or more oxygen, sulfur or nitrogen atoms.

3. The urethane/urea polymer of claim 2 wherein the modifier is an alkylene or cycloalkylene diol.

4. The urethane/urea polymer of claim 3 wherein the alkylene diol is 1,4-butanediol, 1,6-hexanediol or 1,8-octanediol.

5. The urethane/urea polymer of claim 2 wherein the cycloalkylene diol is dimethylol cyclohexane or cyclohexanediol.

6. The urethane/urea polymer of claim 2 wherein the modifier is a triol.

7. The urethane/urea polymer of claim 6 wherein the triol is glycerine or trimethylol propane.

8. The urethane/urea polymer of claim 1 wherein the modifier is a polyether polyol.

9. The urethane/urea polymer of claim 8 wherein the polyether polyol is a poly(ethylene glycol).

10. The urethane/urea polymer of claim 8 wherein the polyether polyol is a poly(propylene glycol).

11. The urethane/urea polymer of claim 1 wherein the weight percent of modifier is from 5 to 80 percent.

12. The urethane/urea polymer of claim 1 wherein the number average molecular weight is from 500 to 20,000.

13. The urethane/urea polymer of claim 1 wherein the active hydrogen end groups are hydroxyl groups.

14. The modified poly(alkylene carbonate) polyahl urethane/urea polymer of claim 1 wherein the is a random polymer corresponding to the formula

wherein $R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group;

M is separately in each occurrence a hydrocarbon radical selected from the group consisting of alkyleneoxy, alkylenethio, alkyleneamino, aralkyleneoxy, aralkylenethio, aralkyleneamino, cycloalkyleneoxy, cycloalkylenethio and cycloalkyleneamino wherein said hydrocarbon radical can also contain one or more additional oxygen, sulfur, or nitrogen atoms;

X is separately in each occurrence S, O, NH,

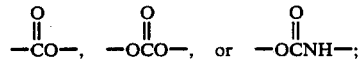

A is separately in each occurrence

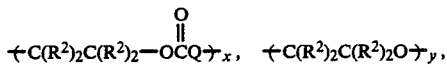

combinations thereof or a covalent bond;

Q is separately in each occurrence O, S or NH provided that all carbonate moieties are internal because terminal carbonate moieties are unstable and form OH moieties by the elimination of $CO_2$;

m is separately in each occurrence an integer of from 1 to 40;

n is separately in each occurrence an integer of from 1 to 25;

s is separately in each occurrence an integer of from 1 to 10;

x is separately in each occurrence an integer of from 1 to 40;

y is separately in each occurrence an integer of from 1 to 120; and z is separately in each occurrence an integer of from 0 to 5.

15. A urethane/urea prepolymer comprising the reaction product of one or more organic polyisocyanates and at least one modified poly(alkylene carbonate) polyahl, which modified poly(alkylene carbonate) polyahl is a polymer comprising: (1) a backbone having (a) the residue of at least one polyahl initiator, (b) a plurality of poly(alkyleneoxy) moieties, and (c) a plurality of poly(alkylene carbonate) moieties; (2) a plurality of active hydrogen end groups; and (3) the residue of at least one modifier which resides in the polymer in the backbone and/or as an end group; wherein the modifier is selected from the group consisting of alkylene, aralkylene and cycloalkylene polyahls and alkylene, aralkylene and cycloalkylene polyahls containing one or more oxygen, sulfur or nitrogen atoms, said modified poly(alkylene carbonate) polyahls having a number average molecular weight higher than the number average molecular weight of any known poly(alkylene carbonate) polyahl comprising the same monomeric components in the same proportions, said modified poly(alkylene carbonate) polyahls containing at least about 5 weight percent carbon dioxide and at least about 5 weight percent modifier the proportion of said modified poly(alkylene carbonate) polyahl to said polyisocyanate being such that all polyahl moieties are reacted with isocyanate moieties and isocyanate moieties are present in excess.

16. A urethane/urea polymer comprising the reaction product of at least one isocyanate-functional prepolymer of claim 15 and at least one polyahl selected from the group consisting of aromatic, aliphatic, arylaliphatic, alkylaromatic and cycloaliphatic polyamines, polymercaptans and polyfunctional hydroxyl compounds.

* * * * *